United States Patent [19]
Goto et al.

[11] Patent Number: 5,678,106
[45] Date of Patent: Oct. 14, 1997

[54] DRIVER FOR PIEZOELECTRIC ACTUATOR AND SHUTTER CONTROL DEVICE UTILIZING PIEZOELECTRIC DEVICE

[75] Inventors: Tetsuro Goto, Funabashi; Akira Katayama, Koganei; Yoshiaki Tanabe, Kawasaki; Masanori Hasuda, Yokohama, all of Japan

[73] Assignee: Nikon Corporation, Tokyo, Japan

[21] Appl. No.: 317,746

[22] Filed: Oct. 4, 1994

Related U.S. Application Data

[62] Division of Ser. No. 849,096, Mar. 9, 1992, Pat. No. 5,371,427.

[30] Foreign Application Priority Data

| Mar. 12, 1991 | [JP] | Japan | 3-45301 |
| Mar. 13, 1991 | [JP] | Japan | 3-72157 |
| Mar. 14, 1991 | [JP] | Japan | 3-49439 |
| Mar. 19, 1991 | [JP] | Japan | 3-78355 |
| Mar. 19, 1991 | [JP] | Japan | 3-78356 |
| Mar. 22, 1991 | [JP] | Japan | 3-81128 |
| Mar. 22, 1991 | [JP] | Japan | 3-83664 |
| Mar. 27, 1991 | [JP] | Japan | 3-87469 |
| Mar. 27, 1991 | [JP] | Japan | 3-87470 |
| Mar. 27, 1991 | [JP] | Japan | 3-87471 |

[51] Int. Cl.$^6$ .................................................. G03B 9/08
[52] U.S. Cl. ........................................ 396/489; 396/248
[58] Field of Search ................................ 354/457, 234.1, 354/246, 249; 396/463, 466, 465, 484, 497, 493, 248, 489

[56] References Cited

U.S. PATENT DOCUMENTS

| 3,742,492 | 6/1973 | Proctor | 310/16 |
| 3,921,015 | 11/1975 | Oheda et al. | 310/317 |
| 4,093,885 | 6/1978 | Brown | 310/331 |
| 4,104,657 | 8/1978 | Frank et al. | 354/457 |
| 4,364,654 | 12/1982 | Senuma et al. | 354/234.1 |
| 4,420,235 | 12/1983 | Terada | 354/266 |
| 4,689,516 | 8/1987 | Yokoyama et al. | 310/317 |
| 4,760,351 | 7/1988 | Newell et al. | 310/320 |
| 4,799,078 | 1/1989 | Hayama | 354/457 |

(List continued on next page.)

FOREIGN PATENT DOCUMENTS

| 0232906 | 8/1987 | European Pat. Off. |
| 3215267 | 11/1982 | Germany |
| 64-34621 | 3/1989 | Japan |

OTHER PUBLICATIONS

Patent Abstracts of Japan, vol. 13, No. 40(P-820), Jan. 30, 1989.
Patent Abstracts of Japan, vol. 9, No. 323(P-414), Dec. 18, 1985.
Patent Abstracts of Japan, vol. 13, No. 303(P-896), Jul. 12, 1989.
Patent Abstracts of Japan, vol. 13, No. 358(P-916), Aug. 10, 1989.

*Primary Examiner*—W. B. Perkey

[57] ABSTRACT

A driving device for a piezoelectric actuator, in which a voltage is applied to a piezoelectric actuator to generate a mechanical deformation therein, thus actuating a mechanical system. In an aspect, the piezoelectric actuator is at first given a voltage of inverse polarity, for generating a displacement in an opposite direction, and then given a voltage of forward polarity, for generating a displacement in the normal functioning direction, thereby actuating the mechanical system. Displacement and acceleration become larger, as the displacement of the actuator takes place from a position in the inverse direction. In another aspect, the electrical insulation state of the piezoelectric actuator is detected and, if deteriorated, the destruction of insulation is prevented by an alarm generation and/or inhibition of voltage application in an embodiment, the insulation state is identified from the ambient humidity of the actuator. In another embodiment, if the detected humidity is at a high level that may induce destruction of insulation, the piezoelectric actuator is driven with a low voltage, in order to dehumidify by heat generation. The piezoelectric actuator may be used in a shutter control device for a camera.

5 Claims, 17 Drawing Sheets

U.S. PATENT DOCUMENTS

| | | | |
|---|---|---|---|
| 4,811,044 | 3/1989 | Tanaka et al. | 354/457 |
| 4,851,870 | 7/1989 | Tanaka et al. | 354/234.1 |
| 4,882,602 | 11/1989 | Tanaka et al. | 354/457 |
| 4,920,373 | 4/1990 | Tominaga et al. | 354/457 |
| 4,963,916 | 10/1990 | Tanaka et al. | 354/457 X |
| 5,053,668 | 10/1991 | Mitsuyasu | 310/317 |
| 5,138,217 | 8/1992 | Wada et al. | 310/316 |
| 5,371,427 | 12/1994 | Goto et al. | |

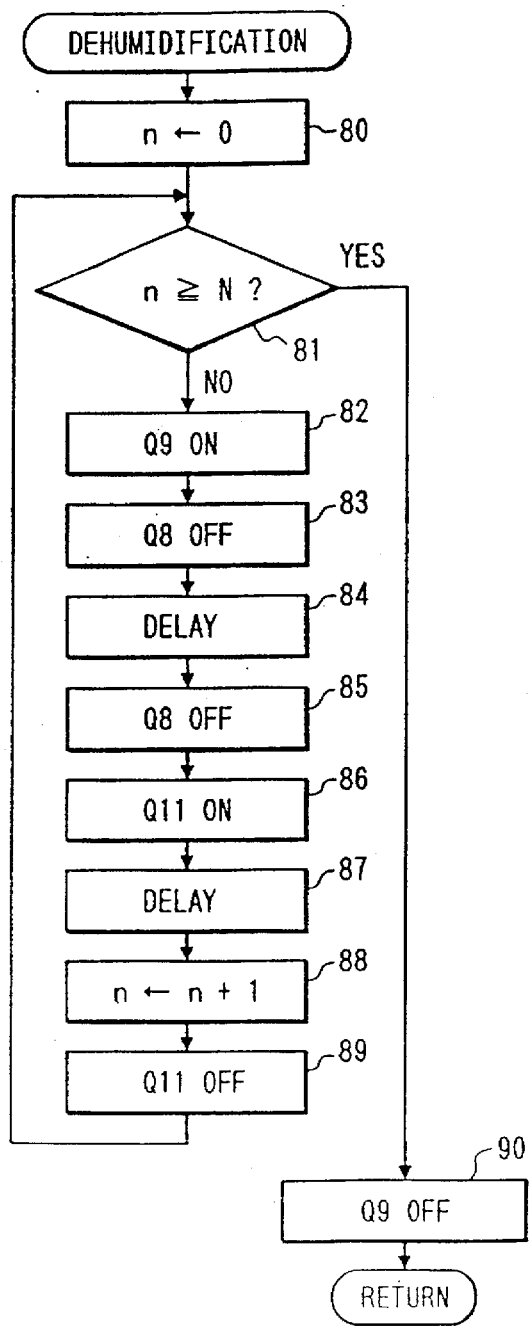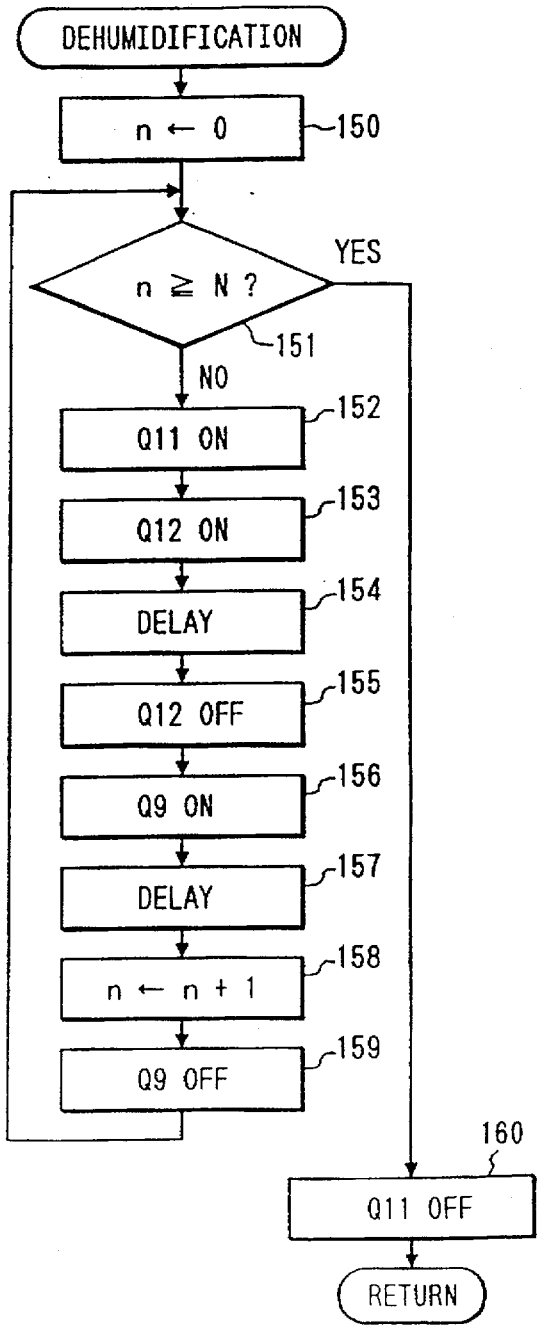

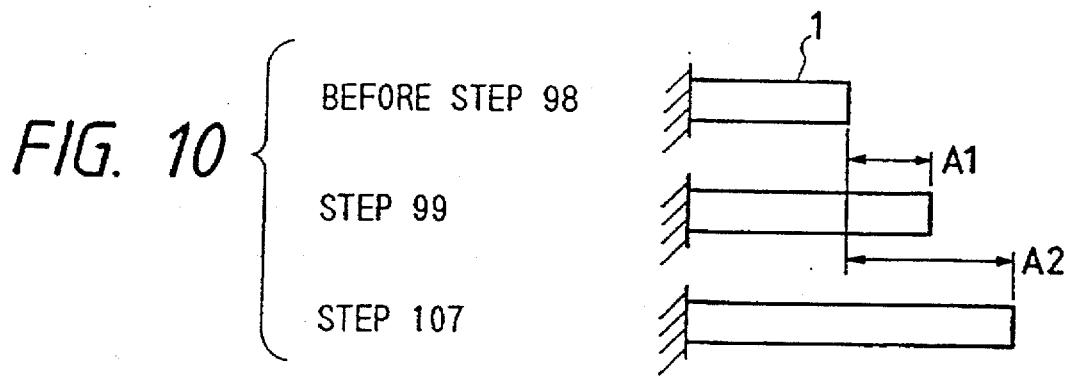
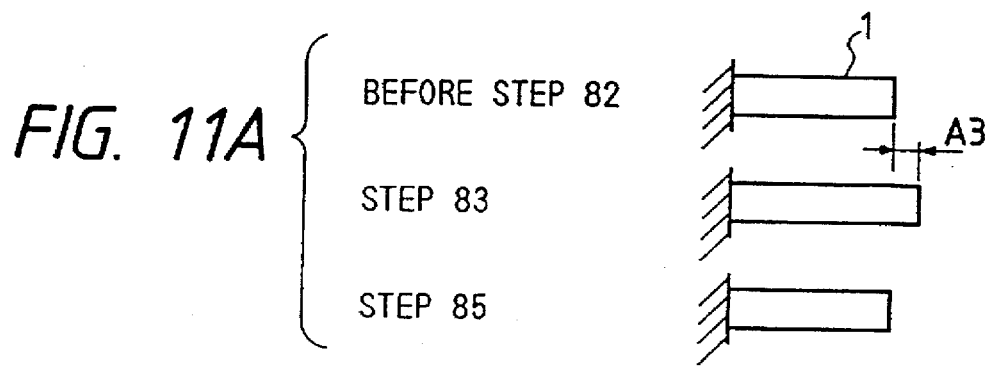
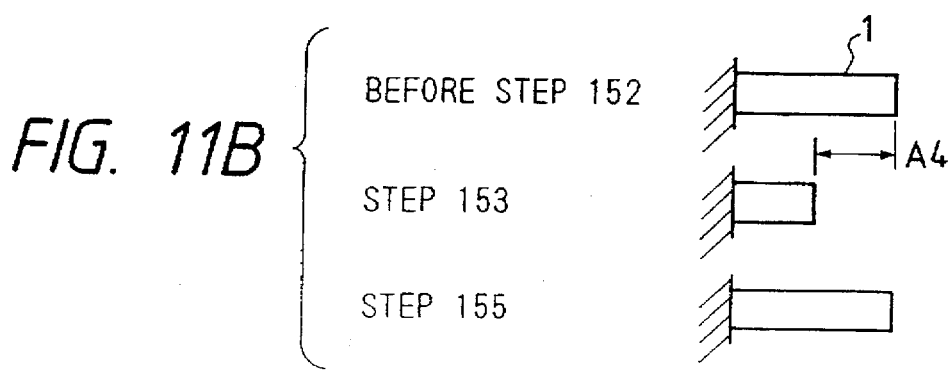

DRIVER FOR PIEZOELECTRIC ACTUATOR AND SHUTTER CONTROL DEVICE UTILIZING PIEZOELECTRIC DEVICE

This is a division of application Ser. No. 07/849,096 filed Mar. 9, 1992, now U.S. Pat. No. 5,371,427.

BACKGROUND OF THE INVENTION

1. Field of the Invention

The present invention relates to a piezoelectric actuator adapted for use in a camera and a shutter control device utilizing a piezoelectric device.

2. Related Background Art

A sp-called piezoelectric actuator is a piezoelectric device used for converting an electrical signal into a mechanical displacement.

Such a piezoelectric device comprises a stack of a plurality of thin ceramic plates having a piezoelectric property, and, upon application of a voltage in the order of 100 V between two electrodes, shows a dimensional change by expansion or contraction depending on the polarity of said voltage.

Although the amount of displacement is limited to the order of tens of microns, such an actuator is investigated as an electromechanical converter for small equipment such as a camera, because it can generate a force as large as tens of kilograms despite its limited volume.

The piezoelectric actuator with the above-mentioned features is utilized for driving a mechanical system, utilizing its expansion or contraction occurring between a state of no voltage application and a state of rated voltage application, but the available displacement and acceleration are limited and insufficient for a general driving source for mechanical systems.

Also, such a piezoelectric actuator is associated with a drawback of slow response, as it takes a certain time from the voltage application to the completion of displacement because of its mechanical inertia.

Besides, such a piezoelectric actuator, constituting a capacitor in the equivalent circuit, absorbs a large current at the start of voltage application, and this current further increases and elevates the power consumption if the applied voltage is elevated in order to increase the amount of displacement. Thus, the application of such a piezoelectric actuator in a camera may reduce the service life of the battery therein, as the camera already includes large electric loads, such as an electronic flash unit and light source for illuminating a liquid crystal display.

Also, since the camera may be used in various postures, there may result a situation where the piezoelectric actuator employed in the camera cannot function properly even under the rated voltage application because of an excessive load, if the functioning direction of the actuator is opposite to the direction of gravity.

This drawback can be avoided by giving a sufficient margin to the maximum acceleration, achieved in the mechanical displacement available from the piezoelectric actuator, in consideration of the load. However, because the camera may be used in varied situations, ranging from underwater to space applications, it is not practical to design the piezoelectric actuator in anticipation of all these situations.

Furthermore, since certain fluctuations in performance are unavoidable in the piezoelectric actuator, in the mechanical loads and in the power supply circuit, the proper function may be hindered even under a proper voltage application, if these fluctuations appear simultaneously in the mutually aggravating manner.

Furthermore, eventual vibration or mechanical shock applied to the camera may also attenuate the force generated by the piezoelectric actuator, thus hindering the proper function thereof even under a proper voltage application.

Furthermore, the above-explained piezoelectric actuator has a drawback of being susceptible to humidity. The piezoelectric actuator is usually hermetically sealed with resin in order to exclude moisture, but the distance between the electrodes formed on both surfaces becomes small because of the multi-layered structure of thin ceramic plates and the insulation may be destroyed by the voltage application in the order of 100 V under a high humidity condition. Such destruction of insulation may be temporary, by is in most cases permanent, whereby the piezoelectric actuator itself is destroyed.

Since the camera is often used under high temperature and high humidity, the piezoelectric actuator employed therein is subjected to the same condition, and may cause destruction of insulation by humidity. This failure of the piezoelectric actuator is only noticed by the absence of start of an exposure operation when the user depresses the shutter button, so that he will lose the opportunity of phototaking.

Furthermore, such a piezoelectric actuator is associated with various drawbacks which are related to a pyroelectric effect it usually exhibits. The pyroelectric effect means a phenomenon of a voltage generation in the piezoelectric actuator by the infrared light or thermal radiation entering the actuator from the atmosphere.

When employed in a camera, the piezoelectric actuator generates a DC voltage between the electrodes thereof by said pyroelectric effect, by absorbing heat from the surrounding atmosphere in a spontaneous manner, even while the voltage application by the depression of a shutter button is not conducted. Although the voltage generation is gradual, it increases with time, thereby hindering proper function of the piezoelectric actuator at the voltage application thereto for a shutter releasing operation. If the voltage generated by the pyroelectric effect is the same in polarity as the applied voltage, there will result an excessively large voltage, eventually leading to the destruction of the piezoelectric actuator or an undesirable effect on the associated electrical circuits. On the other hand, if the voltage resulting from the pyroelectric effect is opposite in polarity to the applied voltage, there will result an insufficient applied voltage.

Also, the piezoelectric device in the actuator, having reversible characteristics, causes a mechanical displacement in response to a voltage application, and also generates a voltage when a mechanical pressure is applied from the outside. Because of this property, if the camera is given a mechanical shock or is dropped, a mechanical impact is given to the piezoelectric actuator to generate a large spike voltage, which flows to the associated circuits, thereby inducing destruction thereof or giving a noise to delicate control circuits.

SUMMARY OF THE INVENTION

A first aspect of the present invention is to provide a piezoelectric actuator that can provide a large displacement with a low electric power consumption.

According to the first aspect of the present invention, there is provided a driver for a piezoelectric actuator, comprising:

a piezoelectric actuator generating a mechanical deformation under a voltage application;

a mechanical unit functioning in response to said mechanical deformation of the piezoelectric actuator;

a forward voltage generating unit for generating a voltage of a predetermined polarity;

an inverse voltage generating unit for generating a voltage opposite in polarity to that of said forward voltage generating unit; and a control unit for applying, to said piezoelectric actuator, the voltage generated by said inverse voltage generating unit and then the voltage generated by said forward voltage generating unit.

In such configuration, the piezoelectric actuator is at first displaced in a direction opposite to the functioning direction by the application of a voltage of inverse polarity, and is then displaced in the functioning direction by the application of a forward voltage. Since the displacement of the piezoelectric actuator starts a position in the opposite direction, the acceleration becomes larger than in the conventional actuator, and the amount of displacement also becomes larger.

A second aspect of the present invention is to provide a driver for piezoelectric actuator; enabling secure function under various conditions.

According to the second aspect of the present invention, there is provided a driver for piezoelectric actuator, comprising:

a piezoelectric actuator generating a mechanical deformation under a voltage application;

a mechanical unit functioning in response to the mechanical deformation;

an end detection unit for detecting the end of function of the mechanical unit;

a voltage generation unit for generating a voltage to be applied to the piezoelectric actuator; and a control unit for applying the voltage generated by the voltage generating unit to the piezoelectric actuator thereby causing the function of the mechanical unit, and applying the voltage again to the piezoelectric actuator in case the end detection unit does not detect the end of function.

In a modification of the above-mentioned driver, there are generated voltages of plural values, and the voltage applied again is made higher than that applied previously.

Even when the mechanical unit cannot complete the function by the activation of the piezoelectric actuator, it can in most cases complete the function if the activation is repeated again, since there is a high probability that the undesirable conditions at the previous function have been removed. Consequently the above-explained configuration improves the security of function.

The completion of function of the mechanical unit can be further secured by making the re-applied voltage higher than the previously applied voltage.

3rd to 5th aspects of the present invention are to prevent destruction of insulation in the piezoelectric actuator under the influence of humidity, etc.

According to the 3rd aspect of the present invention, there is provided a driver for a piezoelectric actuator, comprising:

a piezoelectric actuator generating a mechanical deformation under a voltage application;

a mechanical unit functioning in response to said deformation of the piezoelectric actuator;

a drive unit for applying a voltage to the piezoelectric actuator;

an insulation detection unit for detecting whether the electrical insulation state of the piezoelectric actuator has been deteriorated; and a drive inhibition unit for inhibiting the voltage application to the piezoelectric actuator in case the insulation detection unit identifies that the electrical insulation state of the piezoelectric actuator has been deteriorated.

A modification of said driver further comprises an alarm unit for effecting an alarm providing function in case the insulation detection unit identifies that the electrical insulation state of the piezoelectric actuator has been deteriorated.

The insulation state can be detected, for example, by applying a current to the piezoelectric actuator and comparing the resulting voltage drop with a predetermined value. If the insulation state is deteriorated, the internal resistance of the piezoelectric actuator becomes lower, whereby the generated voltage drop becomes lower than the predetermined value.

According to the 4th aspect of the present invention, there is provided a driver for a piezoelectric actuator, comprising:

a piezoelectric actuator generating a mechanical deformation under application of an input voltage;

a mechanical unit functioning in response to said mechanical deformation of the piezoelectric actuator;

a voltage application unit for applying said input voltage to the piezoelectric actuator;

a humidity detection unit for detecting the ambient humidity of the piezoelectric actuator;

a humidity discrimination-unit for discriminating, based on the output of the humidity detection unit, whether the ambient humidity of the piezoelectric actuator is higher than a limit humidity that may induce destruction of insulation of the piezoelectric actuator; and an application inhibition unit for inhibiting the application of the input voltage to the piezoelectric actuator, in case the humidity discrimination unit identifies that the ambient humidity of the piezoelectric actuator is higher than the limit humidity.

Also according to the 5th aspect of the present invention, there is provided a driver for a piezoelectric actuator, comprising:

a piezoelectric actuator generating a mechanical deformation under application of an input voltage;

mechanical unit functioning in response to the mechanical deformation of the piezoelectric actuator;

a voltage application unit for applying said input voltage to the piezoelectric actuator;

a humidity detection unit for detecting the ambient humidity of the piezoelectric actuator;

a humidity discrimination unit for discriminating, based on the output of the humidity detection unit, whether the ambient humidity of the piezoelectric actuator is higher than a limit humidity that may induce destruction of insulation of the piezoelectric actuator; and an alarm unit for effecting an alarm providing function when the humidity discrimination unit identifies that the ambient humidity of the piezoelectric actuator is higher than said limit humidity.

As explained above, the drivers for piezoelectric actuator, according to the 3rd to 5th aspects of the present invention, identify whether the piezoelectric actuator may cause destruction of insulation, by detecting the insulation state of the piezoelectric actuator or the ambient humidity thereof, and prevent the destruction of insulation by inhibiting the voltage application to the piezoelectric actuator and/or providing an alarm, in case such destruction of insulation is identified to be possible.

A 6th aspect of the present invention is to provide a driver for a piezoelectric actuator, capable of reducing humidity if the ambient humidity of the piezoelectric actuator is high and may induce destruction of insulation thereof.

According to the 6th aspect of the present invention, there is provided a driver for a piezoelectric actuator, comprising:

- a piezoelectric actuator generating a mechanical deformation under a voltage application;
- a mechanical unit functioning in response to the mechanical deformation of the piezoelectric actuator;
- a voltage generation unit for generating a voltage which causes the piezoelectric actuator to generate only a deformation insufficient for the function of the mechanical unit but which is enough for generating heat inside the actuator;
- a humidity detection unit for detecting the ambient humidity of the piezoelectric actuator; and
- a humidity discrimination unit for discriminating, based on the output of the humidity detection unit, whether the ambient humidity of the piezoelectric actuator is higher than a limit humidity that may induce destruction of insulation of the piezoelectric actuator;
- wherein the voltage generated by the voltage generation unit is applied to the piezoelectric actuator in case the humidity discrimination unit identifies that the ambient humidity of the piezoelectric actuator is higher than the limit humidity.

In the above-mentioned driver, prior to the actuation of the mechanical system by the voltage application to the piezoelectric actuator, the ambient humidity of the piezoelectric actuator is detected by the humidity detection unit and is discriminated by the humidity discrimination unit as to whether said humidity is higher than a limit humidity that may induce destruction of insulation of the actuator. If the detected humidity is of a level that may induce destruction of insulation, there is given an alarm and the function of the mechanical system is inhibited. Then the voltage generated by the voltage generation unit is applied to the piezoelectric actuator, thereby generating heat inside the actuator, by the repetition of charging and discharging by the actuator itself, and the function of the mechanical system is enabled after the moisture absorbed in the actuator is removed. It is thus rendered possible to prevent permanent destruction of the piezoelectric actuator by function thereof under a high humidity condition.

A 7th aspect of the present invention is to provide a driver for a piezoelectric actuator, capable of absorbing the voltage generated therein by a pyroelectric effect.

According to the 7th aspect of the present invention, there is provided a driver for a piezoelectric actuator, comprising:

- a piezoelectric actuator having two electrodes and generating a mechanical deformation under application of an input voltage between said electrodes;
- a mechanical unit functioning in response to the mechanical deformation of the piezoelectric actuator; and
- a voltage application unit for applying the input voltage to the piezoelectric actuator;
- wherein the two electrodes of the piezoelectric actuator are shortcircuited while the input voltage is not applied to the piezoelectric actuator.

The shortcircuiting of the electrodes of the piezoelectric actuator allows to eliminate the high voltage generated by the pyroelectric effect.

An 8th aspect of the present invention is to provide a driver for a piezoelectric actuator with a function to absorb the voltage generated by the pyroelectric effect or by a mechanical impact applied to the piezoelectric actuator.

According to the 8th aspect of the present invention, there is provided a driver for a piezoelectric actuator, comprising:

- a piezoelectric actuator generating a mechanical deformation under a voltage application;
- a mechanical unit functioning in response to the mechanical deformation of the piezoelectric actuator;
- a voltage generation unit for generating a voltage to be applied to the piezoelectric actuator; and
- a surge absorber connected parallel to the piezoelectric actuator and normally showing a high impedance characteristic but a low impedance characteristic to a spike voltage generated in the piezoelectric actuator when an impact is given thereto.

Said driver can prevent failure in function or destruction of the electrical circuits, since, if a high voltage is generated between the electrodes of the piezoelectric actuator, for example, by an impact, the surge absorber is shortcircuited to absorb said voltage.

A 9th aspect of the present invention is to improve the response of function of the piezoelectric actuator.

According to the 9th aspect of the present invention, there is provided a driver for a piezoelectric actuator, comprising:

- a piezoelectric actuator generating a mechanical deformation under application of a first voltage;
- a mechanical unit functioning in response to the mechanical deformation of the piezoelectric actuator;
- a first voltage generation unit for generating the first voltage to be supplied to the piezoelectric actuator; and
- a second voltage generation unit for generating a second voltage which causes the piezoelectric actuator to generate a mechanical deformation of a level not inducing the function of the mechanical unit;
- wherein the second voltage is applied to the piezoelectric actuator prior to the application thereto of the first voltage.

Preferably the second voltage generation unit generates a voltage which causes a small vibration of the piezoelectric actuator with a frequency in the vicinity of the mechanical resonance point thereof.

The piezoelectric actuator can be utilized in a small equipment, such as a camera, as a device for converting a voltage into a mechanical displacement. An example of the application of the piezoelectric actuator in a shutter mechanism of a camera is illustrated in FIG. 23, wherein an actuator 201 is used for controlling the start of opening of a leading curtain 220 of the shutter.

FIG. 23 illustrates a state prior to the opening of the leading curtain.

The piezoelectric actuator 201, fixed to a fixing member 202, impinges on an end 206 of a lever 203, which is rendered rotatable abut a shaft 204 and is biased by a spring 205. The lever 203 is provided with a downward pin 207, which is in contact with an end 212 of a lever 209, which is rendered rotatable about a shaft 210 and is biased by a spring 211. The lever 209 is provided with a downwards folded end portion 213, in contact with an end 217 of a lever 214 which is biased by a spring 216 and directly controls the function of a leading curtain 220. The lever 214 is provided with a pin 218 thereunder, and is rendered rotatable about a shaft 215. When the pin 218 is in a position illustrated in FIG. 23, the leading curtain 220 covers an image frame 221 represented by a broken line. When the pin 218 is moved, the leading curtain 220 moves like a pantagraph, thus exposing the image frame 221. The structure of the leading curtain 221 will not be explained in detail, since it is already known. The exposure operation, by the control of the leading curtain 220, is conducted in the following manner.

In response to a voltage application, the piezoelectric actuator 201 extends to the upper right, pressing the end 206 of the lever 203, which thus rotates clockwise about the shaft 204, against the force of the spring 205. Thus, being pressed by the pin 207 at the end 212, the lever 209 rotates counterclockwise against the force of the spring 211. Since the end 213 of the lever 209, impinging on the end 217 of the lever 214, also rotates counterclockwise, the lever 214 rotates counterclockwise about the shaft 215 by the force of the spring 216, whereby the pin 218 moves to the upper right.

Through these operations, the leading curtain 220 moves also to upper right, thus starting the exposure operation.

At a position where the opening of the leading curtain 220 is completed, a pin 222 provided on the lever 214 pushes and turns on a limit switch SW.

A signal from the limit switch SW indicates the secure completion of opening of the leading curtain 220, and is utilized, for example, for triggering an electronic flash unit (not shown in this drawing).

As explained above, the shutter mechanism of the camera requires a separate detection unit for example, for confirming the completion of shutter operation, and inexpensive limit switches are employed for this purpose in most cases.

However, such limit switches often show time-dependent malfunctions that they become unable to be turned off by the fused sticking of contacts after prolonged use, or that they become unable to be turned on by the spreading of the contact distance.

A 10th aspect of the present invention is to provide a configuration capable of dispensing with the above-mentioned limit switches, by utilizing the piezoelectric actuator not only as an actuator but also as a sensor. In the present invention, the piezoelectric actuator is also given a function as a sensor, utilizing its property to generate a voltage between the electrodes, when an impact is applied from the outside.

According to the 10th aspect of the present invention, there is provided a driver for piezoelectric actuator, comprising:

a piezoelectric actuator generating a mechanical deformation under the application of an input voltage;

a first mechanical unit functioning in response to the mechanical deformation of the piezoelectric actuator;

a first circuit unit for applying the input voltage to the piezoelectric actuator;

a second mechanical unit for applying, in response to the function of the first mechanical unit, an impact force to the piezoelectric actuator, thereby causing the piezoelectric actuator to generate an output voltage; and a second circuit unit functioning in response to the output voltage.

In the driver, a mechanical unit utilizing a piezoelectric actuator is combined with another mechanical unit for applying an impact force to the piezoelectric actuator, whereby a signal representing the completion of the function of the first-mentioned mechanical unit, for example, a detection signal for confirming the completion of function, cab be obtained from the same actuator. It is therefore rendered possible to reduce the number of components in the detecting device, and to prevent malfunctions in the contacts of the detecting device.

A conceivable application of the piezoelectric actuator is the shutter control device, for controlling the shutter time of a focal plane shutter or the like. Among such shutter control devices, there is already known, for example, a device disclosed in the Japanese Utility Model Laid-open Application No. 64-34621, comprising a solenoid device, an armature member to be attracted by said solenoid device, a biasing member for biasing said armature member in a direction for releasing said member from said solenoid device, and a resetting member for driving said armature member toward the solenoid device against the force of said biasing member, all being provided in a pair, wherein the function of a camera is controlled by a movement of releasing the armature member from the solenoid device.

However, such a conventional control device has been associated with drawbacks in that the solenoid may become unable to attract the armature member by eventual intrusion of a foreign matter therebetween, and that the function of an armature lever, bearing said armature member thereon, may be delayed by eventual linking of the solenoid and the armature due to oil oozing out of a bearing.

An 11th aspect of the present invention is to provide a control device free from the defective armature attraction or the delayed function of the armature lever.

According to the 11th aspect of the present invention, there is a provided a shutter control device for controlling the exposure time by at first releasing the engagement on a leading curtain and, after the lapse of a predetermined time, releasing the engagement on a trailing curtain, comprising:

first and second laminate piezoelectric devices each generating a mechanical deformation under a voltage application;

a first mechanical unit for releasing the engagement on the leading curtain in response to the deformation of the first laminate piezoelectric device; and a second mechanical unit for releasing the engagement on the trailing curtain in response to the deformation of the second laminate piezoelectric device.

The device, owing to the use of piezoelectric devices, is capable of preventing drawbacks such as shutter malfunction resulting from defective solenoid attraction or fluctuation in exposure time resulting from linking in the conventional mechanisms.

Since the above-mentioned laminate piezoelectric device shows only a deformation in the order of 0.01 mm, said deformation may not provide enough driving force and there may result a shutter malfunction if there is even a small gap between said laminate piezoelectric device and a transmission member in the above-mentioned device. Therefore, in a modification of the foregoing device, there is provided a shutter control device capable of securely obtaining a driving force with a transmission member from even a small deformation of the laminate piezoelectric device, thereby avoiding malfunction of the shutter.

Thus, according to a modification of the 11th aspect of the present invention, there is provided a shutter control mechanism for controlling the exposure time by at first releasing the engagement on a leading curtain and, after the lapse of a predetermined time, releasing the engagement on a trailing curtain, comprising:

first and second laminate piezoelectric devices each generating a mechanical deformation under a voltage application;

a first driving force transmission member for obtaining a driving force for releasing the engagement on the leading curtain in response to the deformation of the first laminate piezoelectric device;

a second driving force transmission member for obtaining a driving force for releasing the engagement on the trailing curtain in response to the deformation of the second laminate piezoelectric device;

a first biasing member for biasing the first driving force transmission member in a direction for impingement on a deforming face of the first laminate piezoelectric device; and a second biasing member for biasing the second driving force transmission member in a direction for impingement on a deforming face of the second laminate piezoelectric device.

In said device, since the driving force transmission members mechanically impinge on the deforming faces of the laminate piezoelectric devices by means of biasing members, the driving forces for releasing the engagements on the leading and trailing curtains are securely obtained by the transmission members, even from small deformations of the piezoelectric devices, whereby the malfunction of the shutter is avoided.

However, since the laminate piezoelectric device shows only a deformation in the order of 0.01 mm, there cannot be provided a sufficient distance in the above-mentioned device, between the members for engaging with the leading and trailing curtains and the members for driving said curtains after the engagements thereon are released, so that the exposure time may fluctuate by eventual collision of the curtain driving members with the engaging members in the course of returning to the engaging positions after the release of engagement. Therefore, another modification provides a shutter control device capable of securely preventing the collision of the engaging members for the leading and trailing curtains with the driving members therefor, by means of a simple mechanism, within a limited space, thereby eliminating the fluctuation in the shutter time.

Thus, according to another modification of the 11th aspect of the present invention, there is provided a shutter control mechanism for controlling the exposure time by at first releasing the engagement on a leading curtain and, after the lapse of a predetermined time, releasing the engagement on a trailing curtain, comprising:

first and second engaging members for respectively engaging with the leading and trailing curtains;

first and second laminate piezoelectric devices each generating a mechanical deformation under a voltage application;

a first engagement releasing member for releasing the engagement of the first engaging member in response to the deformation of the first laminate piezoelectric device;

a second engagement releasing member for releasing the engagement of the second engaging member in response to the deformation of the second laminate piezoelectric device;

a first driving member for driving the leading curtain when the first engagement releasing member releases the engagement of the first engaging member;

a second driving member for driving the trailing curtain when the second engagement releasing member releases the engagement of the second engaging member;

a first returning inhibition member for inhibiting the first engaging member from returning to the engaging position after the release of the engagement; and a second returning inhibition member for inhibiting the second engaging member from returning to the engaging position after the release of the engagement.

In the device, there are provided returning inhibition members for inhibiting the engaging members from returning to the engaging positions after they are released from engagement, thereby avoiding the collision of said engaging members with the driving members for the leading and trailing curtains. Therefore the leading and trailing curtains are maintained free from perturbations after the start of their motions, so that the drawbacks such as the fluctuation in the shutter time can be avoided.

A 12th aspect of the present invention is to provide a shutter control mechanism of a reduced power consumption by the use of a piezoelectric device.

According to the 12th aspect of the present invention, there is provided a shutter control device provided with a shutter unit for effecting an exposure operation and adapted for controlling the function of said shutter means, comprising:

a laminate piezoelectric device generating a mechanical deformation under the application of an input voltage; and a voltage application unit for applying instantaneously the input voltage to the piezoelectric device;

wherein the shutter unit initiates its function by the instantaneous mechanical deformation of the piezoelectric device responding to the instantaneous input voltage.

In the control device, unnecessary waste of electric power is avoided since the voltage application to the piezoelectric device is instantaneous.

A 13th aspect of the present invention is to provide a shutter control device capable of secure shutter operation through the use of a piezoelectric device.

According to the 13th aspect of the present invention, there is provided a shutter control device provided with a shutter unit for effecting an exposure operation and adapted to control the function of said shutter unit, comprising:

a laminate piezoelectric device generating a mechanical deformation under the application of an input voltage;

a voltage application unit for applying the input voltage to said piezoelectric device; and a detection unit for detecting whether the shutter unit has functioned;

wherein the voltage application unit is adapted to cause the shutter unit to function by the mechanical deformation of the piezoelectric device through application of the input voltage thereto, and to terminate the application of the input voltage upon detection of the function of the shutter unit by the detection unit.

In the control device, a secure shutter operation is ensured since the voltage application to the piezoelectric device is terminated after the shutter function is detected.

BRIEF DESCRIPTION OF THE DRAWINGS

FIGS. 1 to 14 illustrate a first embodiment of the present invention, wherein:

FIG. 1 is a block diagram of an electrical circuit for driving a mechanism shown in FIG. 2;

FIG. 2 is a view of a mechanical structure when a piezoelectric actuator is employed for driving the shutter of a camera;

FIG. 3 is a flow chart showing a main routine of a program of the CPU;

FIG. 4 is a flow chart of an insulation state detecting routine;

FIGS. 5A and 5B are flow charts of two examples of a dehumidification routine;

FIG. 6 is a flow chart of a shutter release routine;

FIG. 7 is a flow chart of a release routine shown in a step 61;

FIG. 8 is a flow chart showing a sequence for obtaining a larger displacement and a larger acceleration from the piezoelectric actuator.

FIG. 9 is a flow chart showing an example of routine for improving the response of the piezoelectric actuator;

FIG. 10 is a view showing the expansion of a piezoelectric actuator 1 driven in the normal method shown in FIG. 6;

FIGS. 11A and 11B are views showing displacements of the piezoelectric actuator in the dehumidification routines respectively shown in FIGS. 5A and 5B;

FIG. 12 is a view showing the states of the piezoelectric actuator 1 when the expansion after contraction is utilized for driving a mechanical system in the sequence shown in FIG. 8;

FIG. 13 is a chart showing an AC voltage employed in the present text; and

FIG. 14 is a chart showing an intermittent voltage employed in the present text;

FIGS. 15 to 19 illustrate a second embodiment of the present invention, wherein:

FIG. 15 is a perspective view of a shutter mechanism of a camera employing a piezoelectric actuator, involving a mechanism for applying an impact force to the piezoelectric actuator;

FIG. 16 is a block diagram of an electrical circuit for driving the mechanism shown in FIG. 15;

FIG. 17 is a flow chart of a shutter operating sequence;

FIG. 18 is a block diagram, constituting a part of the block diagram shown in FIG. 16 and showing an electrical circuit for transmitting the output of the piezoelectric actuator to an electronic strobe circuit SB through an intermittently controllable transistor under the control of the CPU; and FIG. 19 is a block diagram of an electrical circuit in which the output of the piezoelectric actuator is directly supplied to a trigger electrode of a discharge tube;

FIGS. 20 to 22 illustrate a third embodiment of the present invention, wherein:

FIG. 20 is a perspective view of a shutter control device; and

FIGS. 21 and 22 are partial views showing the function of the shutter control device.

DETAILED DESCRIPTION OF THE PREFERRED EMBODIMENTS

Now there will be explained a first embodiment of the present invention, with reference to the attached drawings.

Figure 2:
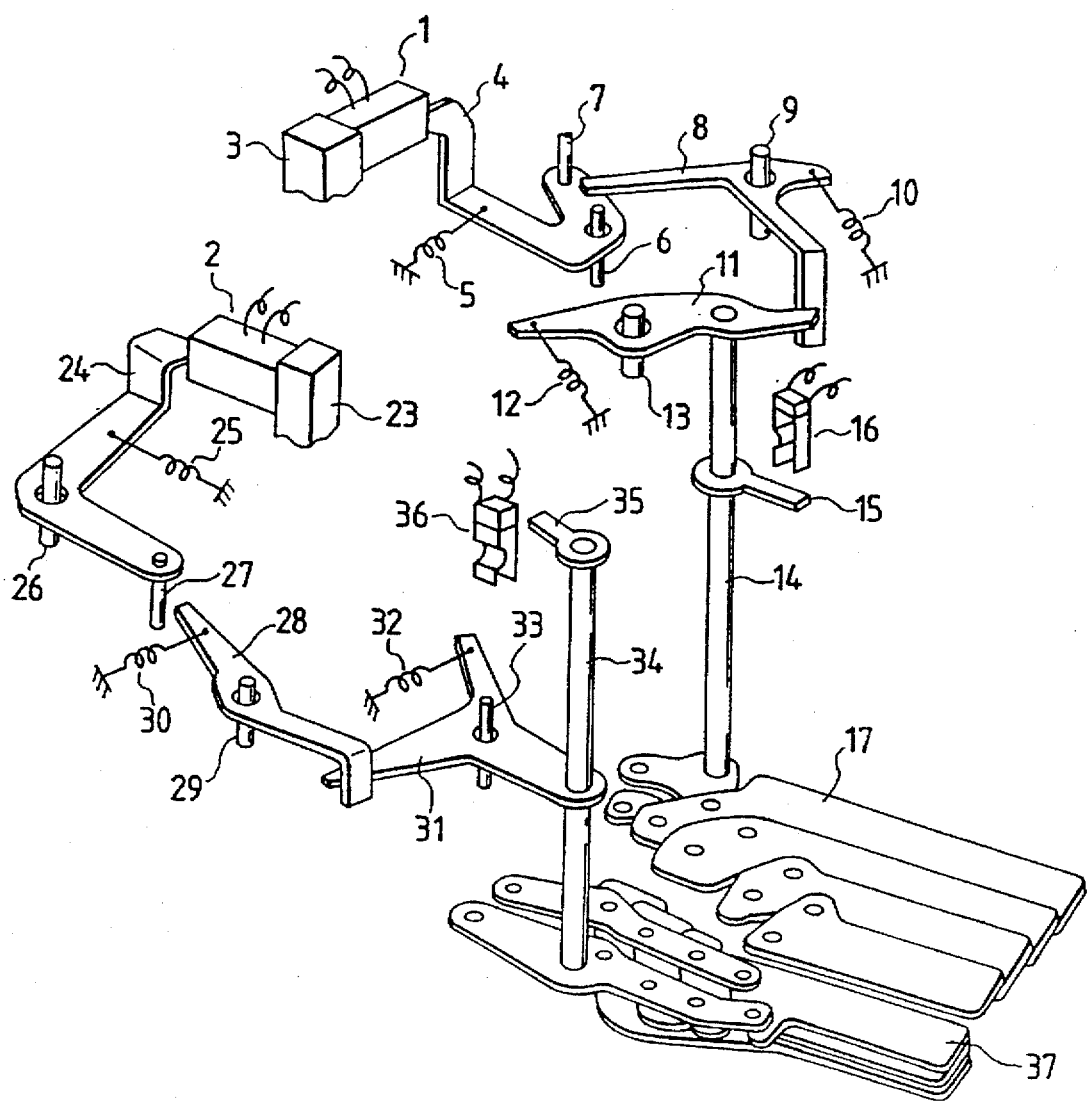

FIG. 2 is a view of a mechanical configuration when a piezoelectric actuator is employed for driving a shutter of a camera.

In FIG. 2 piezoelectric actuators 1, 2 are respectively used for driving a leading curtain 17 and a trailing curtain 37 of a shutter, and there is illustrated a state prior to the function of the leading curtain.

A piezoelectric actuator 1 is fixed to a fixing member 3, and a lever 4 biased by a spring 5 is maintained in contact with an end face of the actuator 1.

The lever 4 is rendered rotatable, with a pin 7 provided thereon, about a shaft 6.

A lever 8, rotatable about a shaft 9 and biased by a spring 10, is engageable at an end with the pin 7 and hinders the rotation of a lever 11, which is rotatable about a shaft 13 and biased by a spring 12, but is normally prevented from rotation by an end of the lever 8.

A pin 14 is provided on the lever 11 for directly controlling the function of a leading shutter curtain 17 which covers an unrepresented film plane in a known manner.

The pin 14 is provided thereon with a lever 15 in a position capable of turning on and off a switch 16, which is turned off in the illustrated position.

Another piezoelectric actuator 2 is fixed to a fixing member 23, and a lever 24 biased by a spring 25 is maintained in contact with an end face of the actuator 2.

The lever 24 is rendered rotatable, with a pin 27 provided thereunder, about a shaft 26.

A lever 28, rotatable about a shaft 29 and biased by a spring 30, is engageable at an end with the pin 27 and hinders the rotation of a lever 31, which is rotatable about a shaft 33 and biased by a spring 32 but is normally prevented from rotation by an end of the lever 28.

A pin 34 is provided on the lever 31 for directly controlling the function of a trailing shutter curtain 37 which is retracted from an unrepresented film plane in a known manner.

The pin 34 is provided, at an end thereof, with a lever 35 for turning on and off a switch 36, which is turned off in the illustrated position.

The exposure operation is conducted in the following manner, by the control of the leading and trailing shutter curtains 17, 37.

The piezoelectric actuator 1, when energized, extends toward the upper right, and this displacement with the resulting acceleration is transmitted to the lever 4.

The lever 4 rotates clockwise against the force of the spring 5, whereby the pin 7 presses an end of the lever 8, thereby causing said lever 8 to rotate counterclockwise about the shaft 9 against the force of the spring 10.

As a result, the lever 11, of which rotation under the biasing force of the spring 12 has been inhibited by the other end of the lever 8, starts to rotate counterclockwise, whereby the leading curtain 17 starts to run toward the upper right, thus starting an exposure operation. At the same time, the pin 14 moves toward, upper right, whereby the lever 15 turns on the switch 16.

Then, at a timing of closing the trailing curtain 37, after the lapse of a predetermined time from the opening of the leading curtain 17, the piezoelectric actuator 2 is energized, whereupon said actuator 2 extends toward the upper left and the resulting displacement is transmitted to the lever 24.

The lever 24 rotates counterclockwise about the shaft 26 against the biasing force of the spring 25, whereby the pin 27 presses an end of the lever 28, thus causing the lever 28 to rotate clockwise about the shaft 29 against the force of the spring 30.

As a result, the lever 31, of which rotation under the biasing force of the spring 32 has been inhibited by the other end of the lever 28, starts to rotate counterclockwise about the shaft 33, whereby the trailing curtain 37 starts to run the toward upper right, thus terminating the exposure operation. At the same time the pin 34 moves toward upper right, whereby the lever 35 turns on the switch 36.

The exposure of film by the leading and trailing shutter curtains 17, 37 is completed in the above-explained manner, and the completion of functions of the curtains 17, 37 can be confirmed by monitoring the state of the switches 16, 36.

Figure 1:
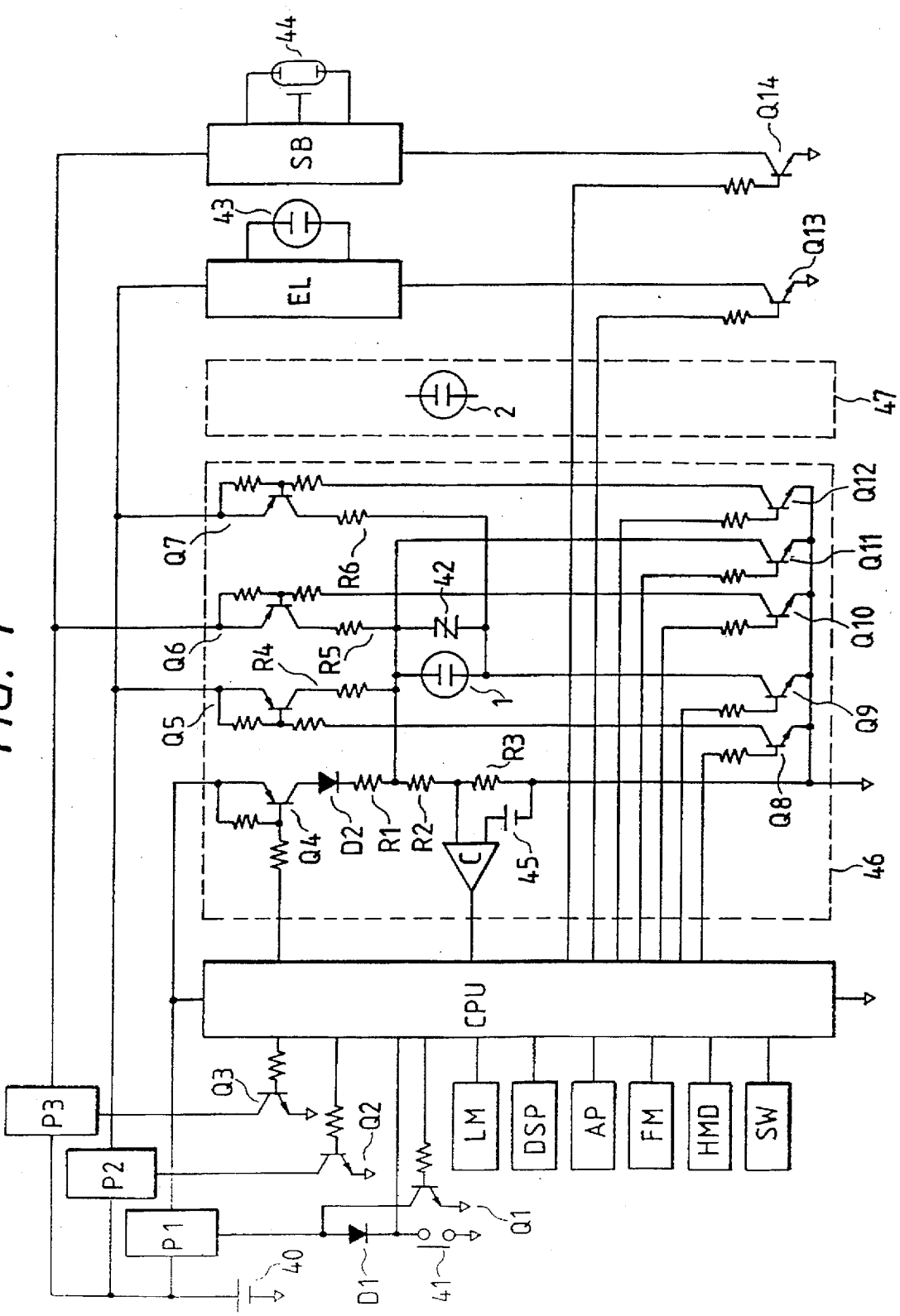

FIG. 1 is a block diagram of an electrical circuit for driving the mechanism shown in FIG. 2. The function of the circuit will be explained in the following.

A battery 40 powers power supply circuits P1, P2, P3. The power supply circuit P1 releases an output voltage of about 5 V, for a control circuit including a CPU.

The power supply circuit P2 releases an output voltage of about 100 V for driving the piezoelectric actuators 1, 2 in the normal state and also for driving a display illumination lamp 43.

The power supply circuit P3 releases an output voltage of about 200 V for driving the piezoelectric actuators 1, 2 in an abnormal state, and also driving a strobe discharge tube 44.

The function of the power supply circuit P1 is controlled by a half-stroke switch 41 which is to be turned on by the actuation of an unrepresented shutter button of the camera, and by the on-state of a transistor Q1 controlled by the CPU. The state of the half-stroke switch 41 is also transmitted to the CPU. A diode D1 is inserted between the transistor Q1 and the half-stroke switch 41 in order to distinguish the on-states thereof. In such configuration, after the half-stroke switch 41 is turned off by the termination of actuation of the shutter button, the transistor 41 remains turned on for a predetermined period, thereby extending the function state of the camera. The above-explained configuration is known in the prior art.

The function of the power supply circuits P2, P3 is controlled respectively by transistors Q2, Q3 which are in turn controlled by the CPU.

To the CPU there are also connected circuit blocks including a light metering circuit LM, a display circuit DSP, an aperture control circuit AP, a film sensitivity signal reading circuit FM, a humidity detection circuit HMD and a group of switches SW, which have the following input/output functions.

The light metering circuit LM enters an object luminance signal to the CPU.

The display circuit DSP provides shutter time information to be controlled and various alarm signals, in a visual or acoustic manner, based on signals from the CPU.

The aperture control circuit AP controls a lens diaphragm to an appropriate aperture, based on a signal from the CPU.

The film sensitivity signal reading circuit FM reads film sensitivity data, provided on a film cartridge in a known manner, and sends said data to the CPU.

The humidity detection circuit HMD detects the humidity in the camera with a humidity sensor and sends a corresponding signal to the CPU. The humidity sensor may be provided in a position allowing identification of the humidity of the piezoelectric actuator provided in the camera. Ideally, it is adhered to the piezoelectric sensor, in order to enable precise humidity detection.

The switch group SW includes a release switch linked with the shutter button and instructing the start of exposure operation, a switch for detecting the completion of film winding, and the aforementioned switches 16, 36 for detecting the completion of movements of the leading and trailing curtains.

Although the wirings are not illustrated, the above-explained circuit blocks are powered from the power supply circuit P1.

The power supply circuit P2 also powers an illumination circuit EL, of which a rear illumination lamp 43 is turned on when a transistor Q13 is turned on by the CPU, thereby illuminating a liquid crystal display device in the aforementioned display circuit DSP.

In the present circuit, the lamp 43 comprises an electroluminescent device, which can be powered by the output voltage of about 100 V of the power supply circuit P2, said output voltage being also used for the piezoelectric actuators 1, 2.

The output voltage of the power supply circuit P3 is supplied to the strobe circuit SB, of which discharge tube 44 emits flash light by turning on a transistor Q14 while the shutter is opened.

The output voltage is also used for driving the piezoelectric actuators in case of an abnormal state, as will be explained later.

Circuit blocks 46, 47 are provided respectively for driving the piezoelectric actuators 1, 2. Since said circuit blocks are mutually identical, the following description will be solely devoted to the actuator 1, and that for the actuator 2 will be omitted.

An upper terminal of the piezoelectric actuator 1 is given the output voltage of the power supply circuit P2 through a transistor Q5 and that of the power supply circuit P3 through a transistor Q6, and is grounded through a transistor Q11 directly controlled by the CPU.

The transistors Q5, Q6 are respectively controlled by transistors Q8, Q10 in turn controlled by the CPU.

A lower terminal of the piezoelectric actuator 1 is grounded through a transistor Q9 controlled by the CPU, or is given the output voltage of the power supply circuit P2 through a transistor Q7, which is controlled by a transistor Q12 driven by the CPU.

The upper terminal of the piezoelectric actuator 1 is given the output voltage of the power supply circuit P1 through a transistor Q4, a diode D2 and a resistor R1, and is also grounded through resistors R2, R3.

The junction between said resistors R2, R3 is connected to an input terminal of a comparator C which makes a comparison with a voltage source 45 and sends the result of said comparison to the CPU.

Between the terminals of the piezoelectric actuator 1 there is connected a surge absorber in a parallel manner.

For the piezoelectric actuator 2 there is provided a peripheral circuit 47 of a similar structure.

The above-explained circuit 46 is driven in the following manner.

At first the power supply circuit P1 starts power supply to activate the CPU, which calculates an appropriate exposure condition, based on the input signals from the light metering circuit LM and the film sensitivity signal detection circuit FM. The result of said calculation is, as already known, displayed by the display circuit DSP, and an alarm is given in addition, if said condition is undesirable.

At the same time, the power supply circuits P2, P3 are activated to generate two high voltages, and the transistor Q13 is turned on to activate the illumination lamp 43, for the liquid crystal display, in the display circuit DSP connected to the power supply circuit P2. The output power of the power supply circuit P3 is accumulated in an unrepresented capacitor of the strobe circuit SB.

In the following, there will be explained the operations of humidity detection and dehumidification.

The humidity detection circuit HMD is activated to detect the humidity of the atmosphere in which the piezoelectric actuator is placed. If the humidity is excessively high and endangers the function of the piezoelectric actuator 1, dehumidification is conducted by the transistors in the circuit block 46 as will be explained in the following.

The dehumidification can be achieved by intermittently applying a voltage of a level not inducing the displacement in the piezoelectric actuator.

More specifically, the transistor Q5 is activated to apply the voltage, and the transistor Q11 is then activated to discharge the accumulated electrical charge. This operation is repeated at a predetermined interval, whereby heat is generated inside the piezoelectric actuator, thereby expelling the humidity accumulated thereon.

In the present embodiment, the dehumidification is conducted by the application of an intermittently generated voltage, but there may also be employed an AC voltage of a frequency, inducing a displacement not affecting the mechanical, aspects in the actuator.

Figure 13:
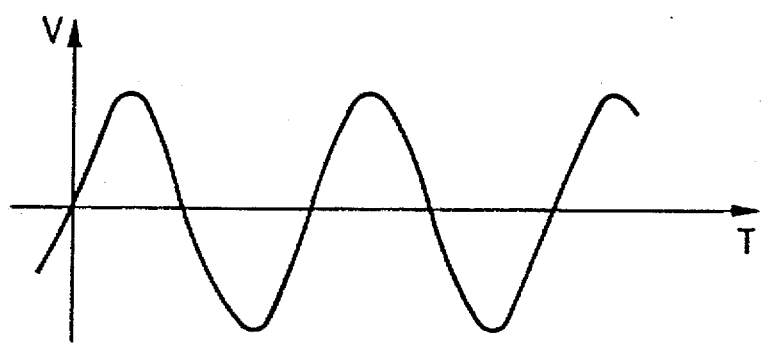

The AC voltage used herein is, as shown in FIG. 13, a voltage continuously varying within certain limits and with a certain cycle period.

Figure 14:
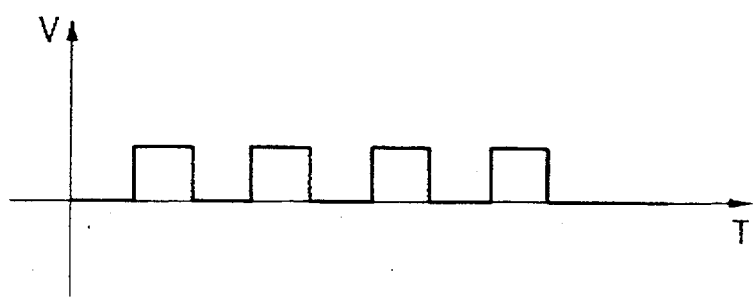

The intermittent voltage means, as shown in FIG. 14, a voltage repeating generation of a voltage value and intermission with a certain cycle period.

Then, there is discriminated whether the piezoelectric actuator is normal, by turning on the transistor Q4 to apply the voltage of the power supply circuit P1 to the piezoelectric actuator 1, dividing the voltage generated at the terminals thereof with the resistors R2, R3 and comparing the thus divided voltage with a voltage source 45 in the comparator C. If the piezoelectric actuator 1 is normal, it has a considerably high insulation resistance, so that the voltage of the power supply circuit P1 applied through the transistor Q4 provides the comparator C with a high divided voltage through the diode D2 and the resistors R1, R2, R3. On the other hand, if the insulation of the piezoelectric actuator 1 is destroyed by the operation thereof under a high humidity condition, the upper terminal of said actuator 1 is equivalently grounded. Thus, when the transistor Q4 is turned on, the voltage applied to the comparator C becomes considerably lower, in comparison with that in the normal state, and the junction between the resistors R1, R2 is grounded. When the voltage at said junction is lower than a predetermined value, the comparator C provides the CPU with a signal indicating an abnormality in the insulation.

The diode D2 is provided for protecting the transistor Q4 from destruction by an inverse voltage application and the power supply circuit P1 from destruction, by the high voltage from the power supply circuit P2 when the transistor Q5 is turned on for driving the piezoelectric actuator 1 as will be explained later.

The resistor R1 is unnecessary in the normal state, but is provided for preventing thermal destruction caused by direct grounding of the transistor Q4 and the diode D2 in case the piezoelectric actuator 1 shows destruction of insulation.

The surge absorber 42 has a property of showing an infinite resistance while the voltage applied between the terminals is within several hundred volts, and being shortcircuited when the voltage becomes higher. In the present embodiment, the surge absorber 42, connected parallel to the piezoelectric actuator 1, serves to protect the peripheral circuits from a high voltage generated by the actuator itself.

The surge absorber 42 does not influence the circuits in any manner in the normal state, but absorbs, by shortcircuiting, a voltage as high as tens of thousand volts eventually generated by a shock given to the camera, thereby preventing the destruction of the transistor Q4, etc. for which resistance to such high voltage cannot be expected.

A piezoelectric member shows a pyroelectric effect when heat is given thereto. Thus, when given heat, the piezoelectric actuator 1 generates a voltage. The function for absorbing the voltage generated by such a pyroelectric effect will be explained in the following.

When the release switch is turned on, instructing the start of exposure, in relation to the actuation of the shutter button, the transistors Q9, Q11 are turned on to dissipate therein the charge generated by the pyroelectric effect in the piezoelectric actuator 1. Such a pyroelectric charge absorbing routine is required not only in the shutter release routine, but may also be conducted at suitable timings such as during the film winding, immediately after the activation of the power supply circuit P1 or immediately before the termination of function thereof. Also, the shortcircuited state may be continued while the power supply circuit P1 is activated and the piezoelectric actuator 1 is not driven, as long as the base current in the transistors Q9, Q11 does not affect the consumption of power of the battery 40.

If the voltage generated by the pyroelectric effect is high, an excessive current may enter the transistors Q9, Q11 at the shortcircuiting thereof, eventually causing thermal destruction. For preventing such a phenomenon, a small resistance may be connected in series with the piezoelectric actuator 1, at the collector side of the transistor Q11.

In the normal state, the piezoelectric actuator is driven, succeeding to the above-mentioned shortcircuit by the transistors Q9, Q11, in the following manner.

The transistor Q8 is turned on, thereby applying the high voltage of the power supply circuit P2 to the upper terminal of the piezoelectric actuator through the transistor Q5. The output voltage of said power supply circuit P2 has to be the recommended working voltage (rated voltage) according to the operating specifications of the piezoelectric actuator, namely such voltage that does not cause destruction of the piezoelectric actuator upon repeated applications. In the present embodiment, it is assumed that said recommended working voltage coincides with the driving voltage of the lamp 43. The piezoelectric actuator 1 is driven through the resistor R4, in order to avoid thermal destruction of the transistor Q5. In the present embodiment, the rated voltage is the voltage obtained from the power supply circuit Q2.

Since the mechanical system utilizes acceleration as shown in FIG. 2, the on-state of the above-mentioned transistors is relatively short.

Through the above-explained operations, the piezoelectric actuator 1 momentarily extends in the longitudinal direction thereof, whereby generated is a driving force, which causes the operations already explained in relation to FIG. 2.

In the following, there will be explained the function of the circuit in case the function of the piezoelectric actuator 1 is not properly transmitted to the mechanical system shown in FIG. 2, because of eventual overlapping of the undesirable conditions such as the fluctuation in the performance of the actuator 1, that in the output of the power supply circuit P2 and the posture of the camera at the phototaking operation.

In case the piezoelectric actuator 1 functions only unsatisfactorily under the application of the voltage from the power supply circuit P2 through the transistor Q5, the leading curtain 17 does not run in the manner explained in relation to FIG. 2, so that the switch 16 is not turned on.

Since said switch 16 is included in the switch group SW, the CPU can recognize that the voltage application from the power supply circuit P2 failed. In such case, the piezoelectric actuator 1 is driven again with a higher voltage.

This time, the transistor Q10 is turned on to apply the output voltage of the power supply circuit P3 to the piezoelectric actuator. In order to prevent the thermal destruction of the transistor Q6, a resistor R5 is serially connected, as in the case of the transistor Q5.

The voltage used for such re-driving is the absolute maximum rated voltage of the piezoelectric actuator 1 or a somewhat lower voltage. Stated differently, the applied voltage does not exceed a level beyond which the destruction of the piezoelectric actuator 1 may arise.

Maximum force and acceleration can be expected from the piezoelectric actuator 1 by the driving with such voltage. In the present embodiment, said voltage is obtained from the power source for the strobe circuit SB, but there may be employed a separate power source.

In the present embodiment, the re-driving is conducted with the voltage from the power supply circuit P3, which is higher than that from the power supply circuit P2, but such re-driving may also be conducted with the same voltage obtained from the power supply circuit P2. It is also possible to drive the actuator for a certain number of times with the rated voltage and then with the maximum permissible voltage.

In the following there will be explained a method for obtaining maximum displacement and acceleration from the piezoelectric actuator 1.

Immediately prior to the main driving, the transistors Q11, Q12 are turned on to apply an inverse potential through a transistor Q7, whereby the piezoelectric actuator 1 contracts in the opposite direction. Also in this state, the lever 4 shown in FIG. 2 follows the end face of the actuator 1, without forming a gap thereto. Immediately thereafter, the above-explained main driving is conducted by the transistors Q5, Q9. Through these operations, the amount of displacement of the piezoelectric actuator 1 is almost doubled, and the resulting acceleration is accordingly increased. Also, said transistor Q7 is provided with a serial resistor R6 for preventing thermal destruction.

FIGS. 3 to 9 are flow charts showing the control sequences of the CPU.

Figure 3:
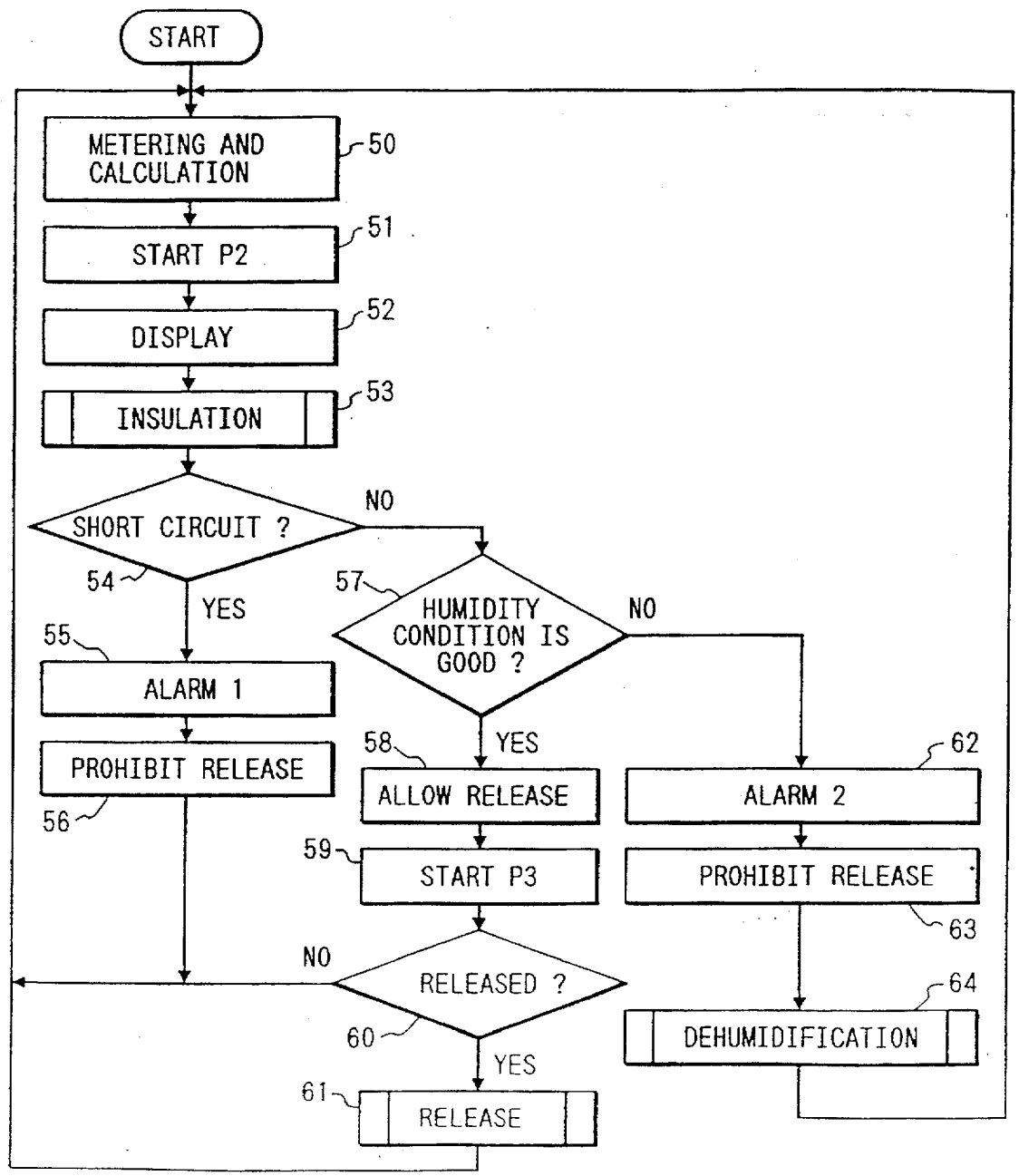

In the following there will be given an explanation on the flow chart shown in FIG. 3.

Figure 6:
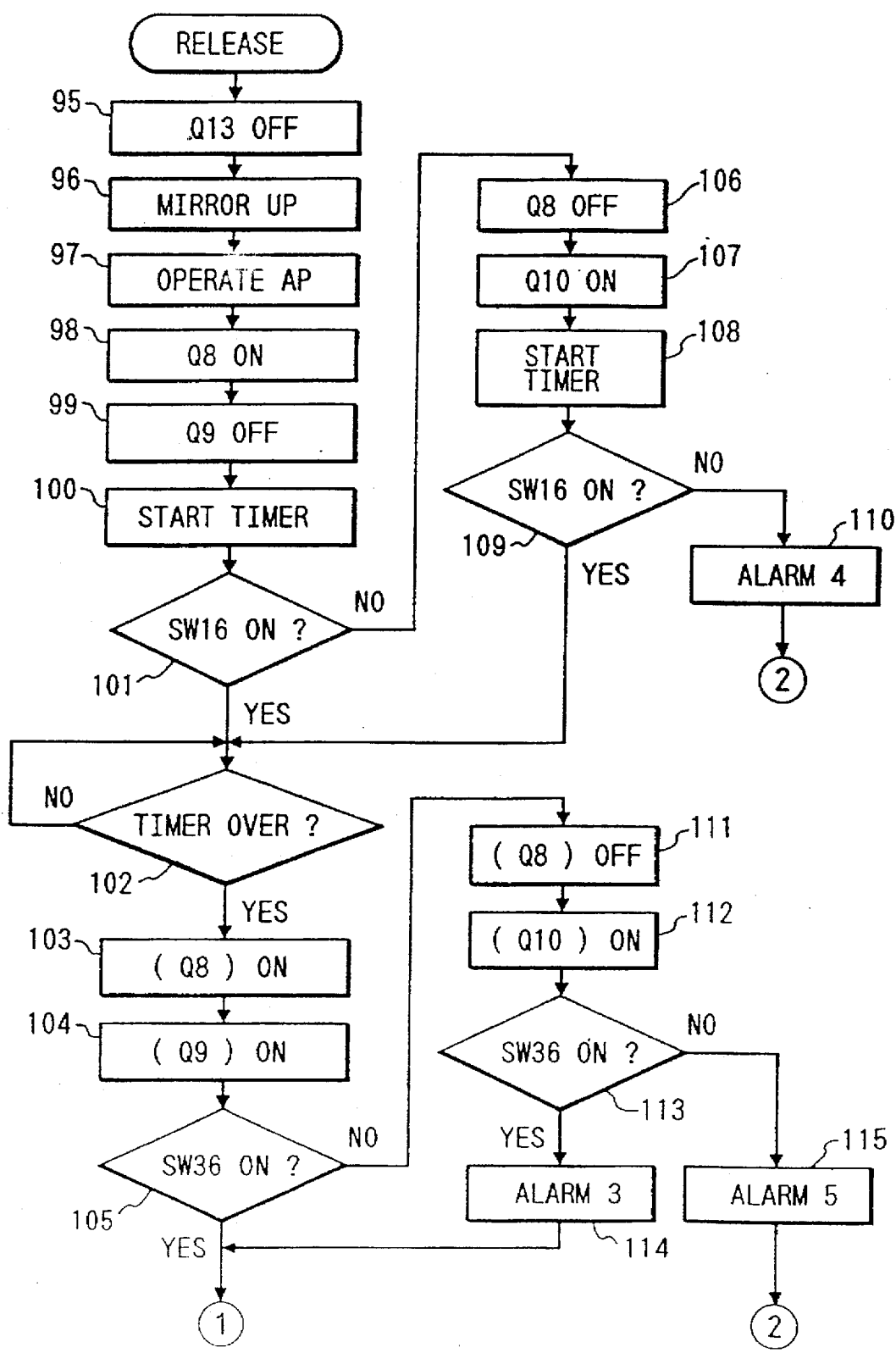

While the power supply circuit P1 is in function, the CPU repeatedly executes this routine:

Step 50: calculates the appropriate control condition, based on the outputs of the light metering circuit LM and the film sensitivity detection circuit FM;

Step 51: activates the power supply circuit P2 and turns on the transistor Q13, thereby lighting the lamp 43;

Step 52: causes the display circuit DSP to display the appropriate control condition obtained in the step 50;

Step 53: executes a check routine for the insulation state of the piezoelectric actuators 1, 2. The details of said routine will be explained in relation to FIG. 4;

Step 54: discriminates, based on the result of the step 53, whether insulation failure is present in the piezoelectric actuator 1 or 2, and the sequence proceeds to a step 55 or 57 respectively if such insulation failure is present or absent;

Step 55: provides an alarm indicating that the piezoelectric actuator 1 or 2 is abnormal, through a visual or acoustic alarm by the display circuit DSP;

Step 56: sets an inhibition state whereby the release routine is not executed even when the shutter button is depressed. Thereafter the sequence returns to the step 50 and continues the display of result of calculation and the alarm for abnormality of the piezoelectric actuator;

Step 57: Since the insulation state is satisfactory, this step detects the humidity state in the camera by the humidity detection circuit HMD. The sequence then proceeds to a step 58 or 62 respectively if the detected humidity is appropriate or not;

Step 58: Since the humidity state is acceptable, this step enables the shutter releasing operation, thereby releasing the inhibition state set in the step 56;

Step 59: activates the power supply circuit P3, thus preparing for the light emission of the strobe circuit SB;

Step 60: discriminates whether the release switch has been turned on by the shutter button, and, if turned on, the sequence returns to the step 50, but, if not, it proceeds to a step 61;

Step 61: executes a release sequence shown in FIG. 6, as the release switch has been turned on;

Step 62: causes the display DSP to provide an alarm that the dehumidification is conducted, as the humidity in the camera is excessively high and is dangerous for the function of the piezoelectric actuators 1, 2;

Step 63: sets a release inhibition state;

Step 64: executes a dehumidification routine shown in FIG. 5. After execution of said routine the sequence returns to the step 50 and repeats the above-explained steps. When the dehumidification is completed, the sequence proceeds to the release routine in the step 61 unless the insulation state is unacceptable.

Figure 4:
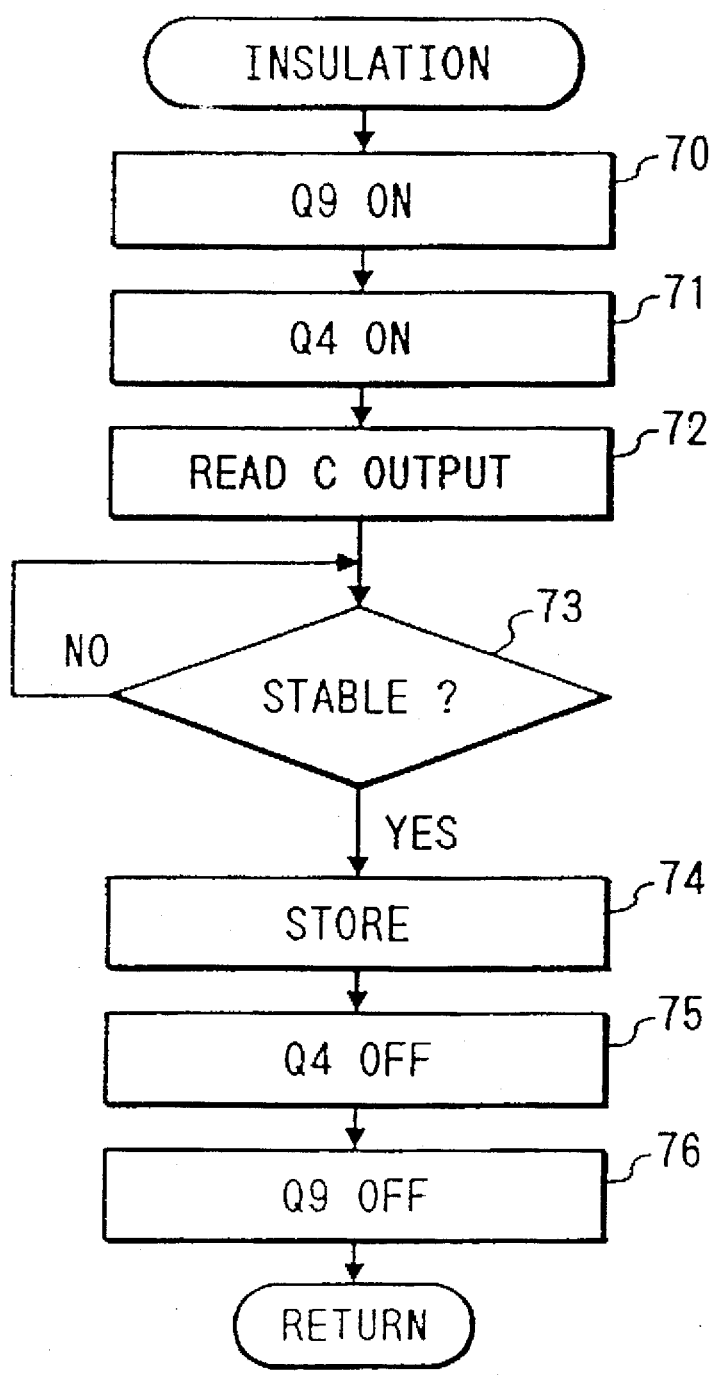

FIG. 4 is a flow chart of the insulation state detecting routine in the step 53, of which details will be explained in the following:

Step 70: turns on the transistor Q9;

Step 71: turns on the transistor Q4, thereby applying the voltage of the power supply circuit P1 to the piezoelectric actuator 1 through the diode D2 and the resistor R1;

Step 72: starts to read the output of the comparator C;

Step 73: repeats reading of the output of the comparator C. Said reading is repeated until said output becomes stable, because, particularly if the actuator 1 is abnormal, the voltage divided by R2 and R3 requires time for stabilization because of the current in the actuator. After reading is stabilized, the sequence proceeds to a step 74;

Step 74: stores the read result in a memory. The step 54 in FIG. 3 is to confirm the content of the memory stored in this step;

Step 75: turns off the transistor Q4;

Step 76: turns off the transistor Q9, whereby the routine for applying the output of the power supply circuit P1 to the piezoelectric actuator 1 is completed.

A similar routine is required for the piezoelectric actuator 2 but the details of said routine will be omitted.

FIGS. 5A and 5B are flow charts showing two examples of the dehumidification routine in the step 64. In the routine shown in FIG. 5A, the piezoelectric actuator is extended in the longitudinal direction by a voltage application, while, in the routine shown in FIG. 5B, the actuator is contracted in said direction by an inverse voltage application.

In the following there will be explained the flow chart shown in FIG. 5A:

Step 80: sets the number n of repetition at 0;

Step 81: discriminates whether the number n of repetition has exceeded a predetermined number N, and the sequence proceeds to a step 90 or 82 respectively if said number N is exceeded or not;

Step 82: turns on the transistor Q9, as the number n of repetition has not reached the number N;

Step 83: turns on the transistor Q8, whereby the transistor Q5 is turned on and the output voltage of the power supply circuit P2 is applied to the piezoelectric actuator 1;

Step 84: sets a certain delay time, thereby defining the voltage application time to the piezoelectric actuator 1, during which said actuator is charged;

Step 85: turns off the transistor Q8, whereby the transistor Q5 is turned off and the voltage application from the power supply circuit P2 is terminated;

Step 86: turns off the transistor Q11, whereby the charge accumulated in the piezoelectric actuator 1 is discharged;

Step 87: sets a certain delay time, in order to ensure discharge;

Step 88: adds 1 to the number n of repetition as one cycle of charge and discharge has been completed;

Step 89: turns off the transistor Q11.

The above-explained charge-discharge cycle is repeated until the number n of repetition reaches the number N. When said number N is reached, the sequence proceeds from the step 81 to a step 90.

Step 90: turns off the transistor Q9, and the sequence returns to the step 50 to repeat the above-explained sequence.

In the following, there will be explained the flow chart shown in FIG. 5B where, however, the flow from a step 150 to 151 will be omitted as it is similar to that from the step 80 to 81 in FIG. 5A:

Step 152: turns on the transistor Q11 as the number n of repetition has not reached a number N', which is smaller than the number N in FIG. 5A because the charging time to the piezoelectric actuator can be made longer than in the sequence shown in FIG. 5A as will be explained later;

Step 153: turns on the transistor Q12, whereby the transistor Q7 is also turned on and the output voltage of the power supply circuit P2 is applied to the piezoelectric actuator 1;

Step 154: sets a certain delay time, thereby defining the voltage application time to the piezoelectric actuator 1, during which said actuator is charged. Said delay time is longer than that in the step 84 in FIG. 5A, because, in case of FIG. 5A, a longer charging time may affect the mechanical system because the actuator is extended, whereas, in case of FIG. 5B, the mechanical system is not affected by a longer charging time because the actuator is contracted;

Step 155: turns off the transistor Q12, whereby the transistor Q7 is also turned off and the application of the output voltage of the power supply circuit P2 is terminated;

Step 156: turns on the transistor Q9, whereby the charge accumulated in the piezoelectric actuator 1 is discharged;

Step 157: sets a certain delay time, in order to ensure discharge;

Step 158: adds 1 to the number n of repetition as one cycle of charge and discharge has been completed;

Step 159: turns off the transistor Q9.

The above-explained charge-discharge cycle is repeated until the number n of repetition reaches the number N'. When said number N' is reached, the sequence proceeds from the step 151 to 160;

Step 160: turns off the transistor Q11, and the sequence then returns to the step 50 for repeating the above-explained sequence.

In the sequence shown in FIG. 5A, the charging time has to be selected at a level not inducing a displacement in the piezoelectric actuator 1, since, otherwise, the mechanical system shown in FIG. 2 is actuated during the dehumidification. However, the sequence shown in FIG. 5B does not affect the mechanical system as the piezoelectric actuator contracts. The repeating frequency and the number N of repetition have to be determined strictly from the experimental data on the moisture resistance of the piezoelectric actuator to be used, but in general a drive for several ten milliseconds with a frequency of several kHz.

Also, in the present embodiment, the numbers N, N' are maintained constant regardless of the humidity, but they may be varied according to the humidity.

Figure 7:
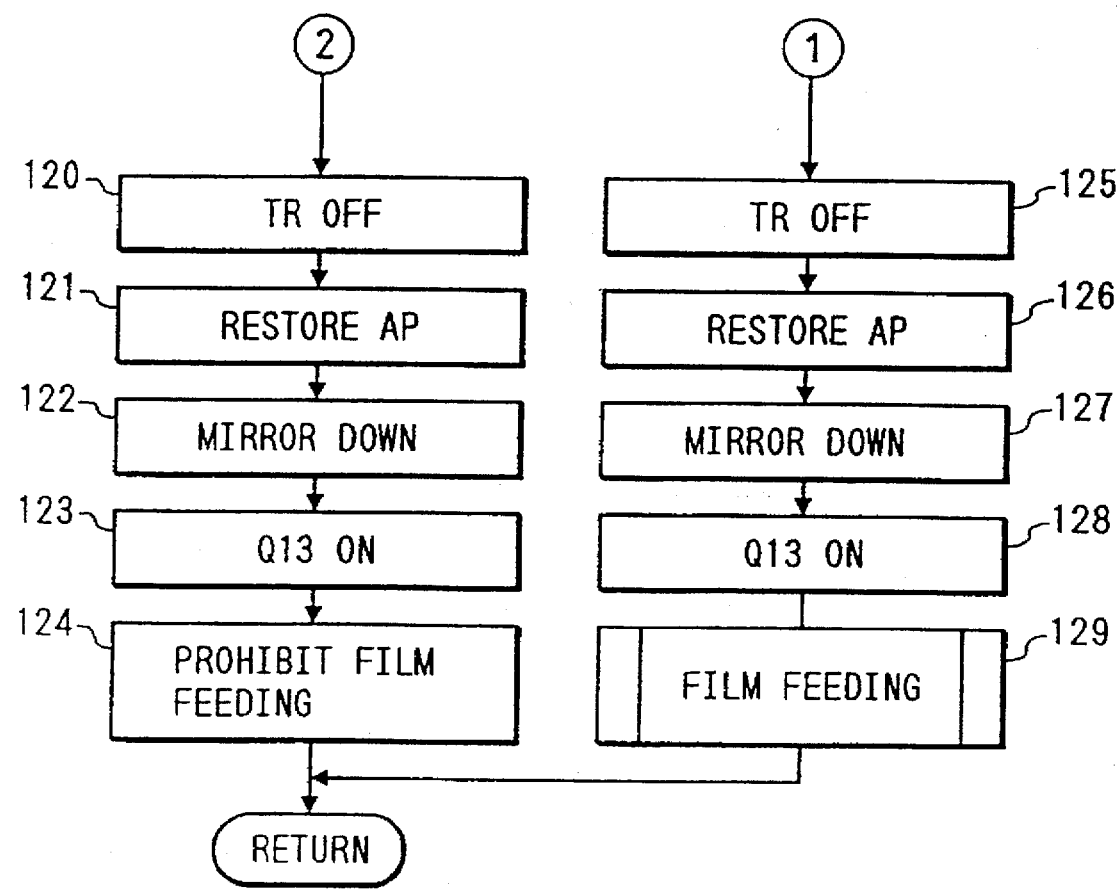

FIGS. 6 and 7 are flow charts of a release routine shown in the step 61, in which:

Step 95: turns off the transistor Q13, whereby the illuminating lamp 43 is turned off and the output voltage of the power supply circuit P2 is thereafter solely used for the piezoelectric actuators 1, 2;

Step 96: lifts a mirror of the camera;

Step 97: drives the aperture control circuit AP to set the diaphragm at a predetermined aperture;

Step 98: turns on the transistor Q8, whereby the transistor Q5 is turned on;

Step 99: turns on the transistor Q9. The piezoelectric actuator 1 is driven by the power supply circuit P2;

Step 100: starts the measurement of a predetermined shutter time;

Step 101: confirms whether the switch 16 has been turned on, in order to identify whether the piezoelectric actuator 1 has properly driven the mechanical system, and the sequence proceeds to a step 102 if the switch 16 is on but it proceeds to a step 106 if the switch 16 is off, namely if the leading curtain system has not been operated;

Step 102: discriminates whether the time measurement started in the step 100 has been completed, and the sequence proceeds to a step 103 or 102 respectively if said measurement has been completed or not;

Step 103; executes a process for controlling the trailing curtain, 37 as the measured time has reached the predetermined value, by turning on a transistor for the piezoelectric actuator 2, corresponding to the transistor Q8, whereby a transistor corresponding to Q5 is also turned on;

Step 104: turns on a transistor corresponding to Q9, whereby the piezoelectric actuator 2 is energized;

Step 105: confirms that the switch 36 has been turned on, and the sequence proceeds to a step 125 in FIG. 7 if said switch 36 is on, but it proceeds to a step 111 if said switch 36 is off, namely if the rear curtain system has not properly functioned;

Step 125: turns off all the transistors related to the driving of the piezoelectric actuators 1, 2;

Step 126: shifts the diaphragm to the original state;

Step 127: lowers the mirror;

Step 128: turns on the transistor Q13, thereby restarting the illumination by the lamp 43;

Step 129: executes a film winding routine, as the exposure to the film has been completed through the foregoing routine.

In relation to the film feeding, the foregoing film feeding routine only has been explained. The film rewinding will not be explained as it can be executed by a known method.

In case the step 101 identifies that the switch 16 is not turned on, namely if the leading curtain system has not properly functioned, there is executed the following sequence:

Step 106: turns off the transistor Q8, whereby the transistor Q5 is again turned off to terminate the voltage application from the power supply circuit P2;

Step 107: turns on the transistor Q10, whereby the transistor Q6 is turned on to apply the output voltage of the power supply circuit P3 to the piezoelectric actuator 1.

As explained in the foregoing, the voltage application from the power supply circuit P3 is to obtain the maximum displacement of the piezoelectric actuator 1. Since the applied voltage is close to the absolute maximum rated voltage, such voltage, if always used, may undesirably affect the durability of the piezoelectric actuator. Said voltage is therefore used only in such abnormal state;

Step 108: restarts the measurement of the shutter time;

Step 109: confirms whether the switch 16 has been turned on. If the leading curtain system has properly functioned by the foregoing emergency sequence, the switch 16 is turned on so that the sequence returns to the step 102 and continues the above explained procedure. In such case the alarm is not given, because the failure in operation may have resulted from a camera posture or an external impact, so that an alarm may confuse the user. On the other hand, if the leading curtain system still has not functioned through the foregoing sequence, the switch 16 remains turned off whereupon the sequence proceeds to a step 110:

Step 110: provides, by the display circuit DSP, an alarm indicating that the leading curtain system has not functioned, and the sequence proceeds to a step 120 in FIG. 7;

Step 120: turns off all the transistors relating to the driving of the piezoelectric actuators 1, 2;

Step 121: shifts the diaphragm to the original state;

Step 122: lowers the mirror;

Step 123: turns on the transistor Q13 to activate the lamp 43;

Step 124: inhibits the film feeding since such feeding is unnecessary in this state, because the exposure has not been conducted by the failure of the leading curtain 17. Then, the sequence returns to the step 50 in FIG. 3 for effecting an alarm providing operation.

In case the rear curtain system has not properly functioned in the step 105, there is conducted the following sequence:

Step 111: turns off the transistor for the piezoelectric actuator 2, corresponding to the transistor Q8, whereby the transistor corresponding to Q5 is also turned off to terminate the drive by the power supply circuit P2;

Step 112: turns on the transistor corresponding to Q10, whereby the transistor corresponding to Q6 is turned on to apply the output voltage of the power supply circuit P3, for the same purpose as in the leading curtain system;

Step 113: confirms whether the switch 36 has been turned on, and the sequence proceeds to a step 114 or 115 respectively if the switch 36 is on or off;

Step 114: provides an alarm that the appropriate exposure has not been obtained, because the exposure time has been extended by the steps 111, 112 and 113 though the exposure has been completed by the trailing curtain system as indicated by the closing of the switch 36.

Such an alarm is naturally unnecessary if the steps 111, 112, 113 are relatively short in comparison with the exposure time, and needs only to be given in case a short exposure time is selected.

Thereafter, the sequence proceeds to a step 120 in FIG. 7 to execute the above-explained sequence. In case the trailing curtain system again does not function in the step 113, there is conducted the following sequence:

Step 115: provides an alarm that the shutter curtain is left open, and there is conducted the aforementioned routine starting from the step 125 in FIG. 7.

Figure 8:
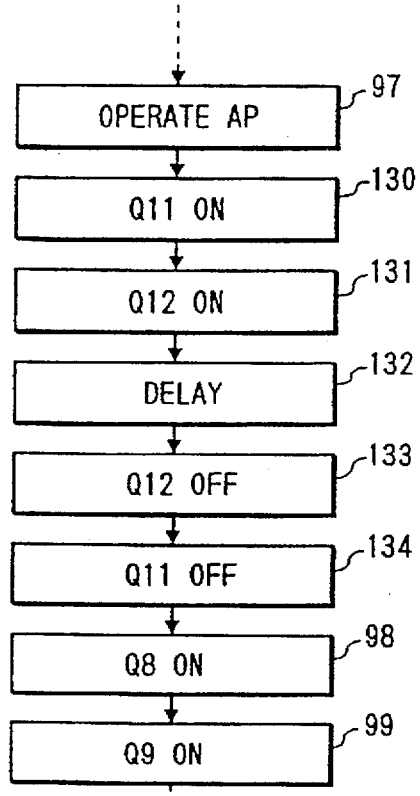

FIG. 8 is a flow chart showing a method for obtaining a large displacement and acceleration from the piezoelectric actuators 1, 2, and this sequence is executed after the step 97 in FIG. 6 and before the step 98;

Step 130: turns on the transistor Q11, thereby grounding the upper terminal of the piezoelectric actuator 1;

Step 131: turns on the transistor Q12, whereby the transistor Q7 is turned on to apply the output voltage of the power supply circuit P2 to the lower terminal of the piezoelectric actuator 1, which thereby contracts;

Step 132: maintains the above-mentioned inverse voltage application for a certain delay time;

Step 133: turns off the transistor Q12, thereby terminating the inverse voltage application;

Step 134: turns off the transistor Q11.

The above-explained routine causes the piezoelectric actuator 1 to contract, so that a larger displacement and acceleration can be obtained in combination with the extension of the actuator starting from the step 98. Though not explained in detail, a similar inverse voltage applying routine may be applied to the piezoelectric actuator 2 for obtaining a larger displacement and acceleration therefrom.

Figure 9:
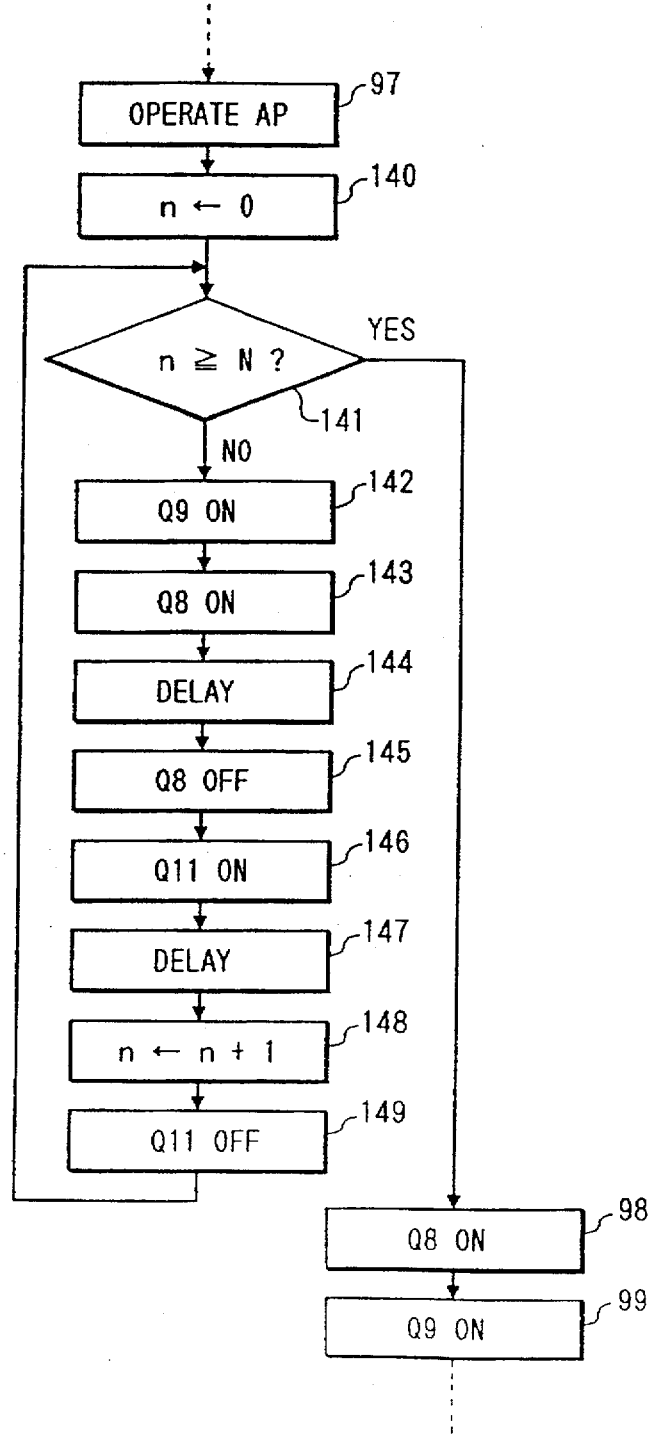

FIG. 9 is a flow chart showing an example of a routine for improving the response of the piezoelectric actuator, by causing a small vibration in the actuator with a frequency close to the mechanical resonance point thereof, thereby achieving a faster displacement in the succeeding main drive. This routine is similar to the dehumidification routine shown in FIG. 5, but is different in the interval of operations and in the duration. This routine is executed also between the steps 97 and 98:

Step 140: sets the number n of repetition at 0;

Step 141: discriminates whether the number n of repetition has reached a predetermined number N, and the sequence returns to the step 98 or proceeds to a step 142 respectively if said number N is reached or not;

Step 142: turns on the transistor Q9, as the number n of repetition has not reached the number N;

Step 143: turns on the transistor Q8, whereby the transistor Q5 is also turned on to apply the output voltage of the power supply circuit P2 to the piezoelectric actuator 1;

Step 144: sets a certain delay time thereby defining the voltage application time to the piezoelectric actuator 1, during which said actuator 1 is charged;

Step 145: turns off the transistor Q8, whereby the transistor Q5 is also turned off to terminate the output voltage application from the power supply circuit P2;

Step 146: turns on the transistor Q11, whereby the charge accumulated in the piezoelectric actuator 1 is discharged;

Step 147: sets a certain delay time for ensuring the discharge;

Step 148: adds 1 to the number n of repetition as one cycle of charge and discharge has been completed;

Step 149: turns off the transistor Q11.

The above-explained sequence is repeated until the number n of repetition reaches the number N. When said number N is reached, the sequence proceeds from the step 141 to the step 98 for executing the succeeding routine for controlling the movement of the leading shutter curtainn.

In the above-explained sequence, the charging time has to be selected at a level not causing displacement of the piezoelectric actuator 1, since, otherwise, the mechanical system shown in FIG. 2 is actuated during this preparatory routine. Also, the repeating frequency and the number N of repetition have to be exactly determined from the response, based on the resonance characteristics of the piezoelectric actuator 1 to be used, but in general a drive for several milliseconds with a frequency of several kHz is sufficient. Though not explained in detail, a similar process is applicable also to the piezoelectric actuator 2.

FIGS. 10, 11A and 11B and 12 illustrate the states of extension/contraction of the piezoelectric actuator 1 in the foregoing routines.

FIG. 10 shows the states of the actuator 1 in the normal driving method shown in FIG. 6.

In a stationary state up to the step 98, the piezoelectric actuator 1 has a length illustrated at the top. A displacement A1 is obtained by the application of the output voltage of the power supply circuit P2 in the step 99. If said displacement A1 is insufficient for driving the mechanical system, the output voltage of the power supply circuit P3 is applied to the actuator 1 to generate therein a displacement A2, larger than A1, in the step 107. The present invention is featured by the utilization of the change in displacement and the resulting acceleration.

FIG. 11A shows the displacements of the piezoelectric actuator 1 during the dehumidification routine shown in FIG. 5A.

In the AC voltage drive in which the driving voltage is removed before the displacement becomes saturated, there is obtained a displacement A3 between the steps 82 and 83. Before said displacement approaches to A1, the sequence proceeds to the step 85 whereby the actuator returns to the original length.

FIG. 11B shows the displacements of the actuator 1 during the dehumidification routine shown in FIG. 5B.

In the AC voltage drive in which the driving voltage is removed before the displacement becomes saturated, there is obtained, between the steps 152 and 153, a displacement A4 which is larger than A3 shown in FIG. 11A.

Figure 12:
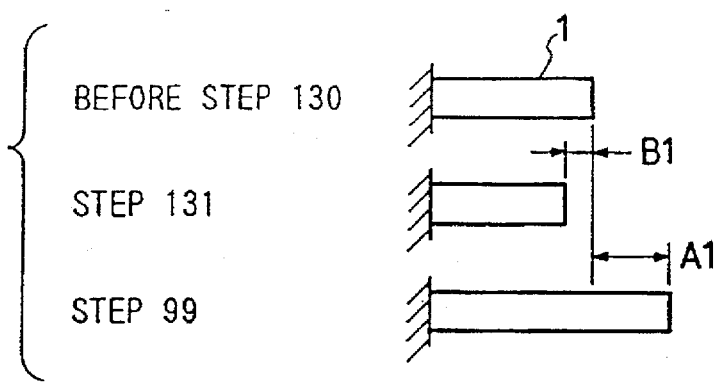

FIG. 12 shows the states of the piezoelectric actuator 1 when the extension after contraction is utilized for driving the mechanical system, as explained in FIG. 8.

The actuator, having the original length up to the step 130, contracts by B1 by the inverse voltage application in the step 131, and then extends by A1 from the original length, by the voltage application in the step 99. As explained before, the sum of the displacements B1 and A1 is utilized for driving the mechanical system.

The dehumidification in the present embodiment is executed when the half-stroke switch is turned on, but it may also be conducted in response to the closing of an unrepresented main switch. Furthermore, it may be executed in response to the closing of an unrepresented dehumidification switch, to be closed by the depression of an unrepresented dehumidification button.

In the following there will be explained a second embodiment of the present invention shown in FIG. 15, in which the driving device for a piezoelectric actuator of the present invention is applied to a shutter control device.

Figure 23:
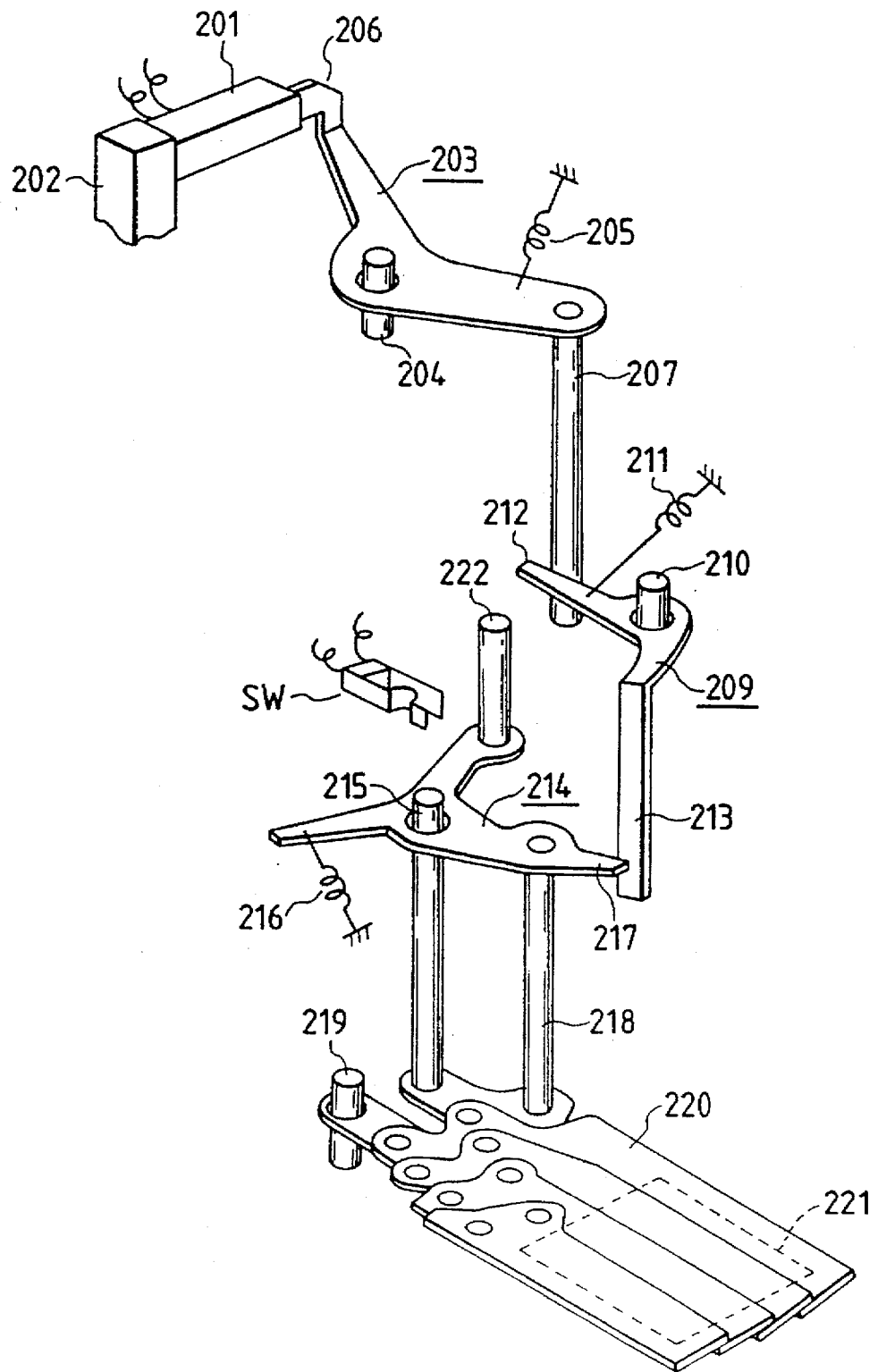
FIG. 23 is a view releated to the second embodiment and showing a shutter mechanism of a camera, in which a piezoelectric actuator is employed in a conventional method not belonging to the present invention.

This device comprises an addition of a mechanism of the present invention to the aforementioned configuration shown in FIG. 23, and the components equivalent to those in FIG. 23 are represented by same numbers. The piezoelectric actuator 201, levers 209, 219 and leading curtain 220 are identical with those in FIG. 23, but levers 223, 226 are provided for giving an impact force to said piezoelectric actuator 1. The end 206 of the lever 203 serves not only to receive the extension of the actuator 201 for opening the leading shutter curtain, but also to provide the actuator with an impact force.

The lever 223, rotatable about a shaft 224, is provided thereon with a pin 225, which is positioned between ends 229, 230 of the lever 226 and does not interfere with said lever 226. Said lever 226 is rotatable about a shaft 228 and is biased by a spring 227. The end 230 of the lever 226 has a shoulder, as shown in FIG. 15, in a base portion 231, with which engages an end portion 208 extended newly from the lever 203.

The above-explained configuration functions in the following manner.

The opening of the leading shutter curtain 220 by the rotation of the levers 203, 209, 214 in response to the voltage application to the piezoelectric actuator 201 is realized as explained before. In the following there will be explained only the functions different from the foregoing.

In the clockwise rotation of the level 203 in the initial stage of function, the end portion 208 thereof moves backward from the plans of drawing, whereby the lever 226 rotates counterclockwise under the biasing force of the spring 227, whereby the end portion 208 of the lever 203 engages with the narrower end portion 230 of the lever 226. Therefore, the lever 203 is maintained in a slightly clockwise rotated position, thereby creating a certain gap between the piezoelectric actuator 201 and the end 206 of the lever 203.

As the lever 214 rotates counterclockwise with the progress of the function, the pin 222 pushes an arm 232 of the lever 223, causing an counterclockwise. rotation thereof. Said counterclockwise rotation has to exactly coincide with the exposure of the image frame 221 by the leading curtain 220. A pin 225 provided on the lever 223 moves the end portion 229 of the lever 226 toward the front, thereby causing a clockwise rotation thereof. Consequently the end portion 208 of the lever 203 is disengaged from the end portion 230 of the lever 226, whereby the end 206 of the lever 203 hits the piezoelectric actuator 201, thus generating a voltage therein.

Figure 15:
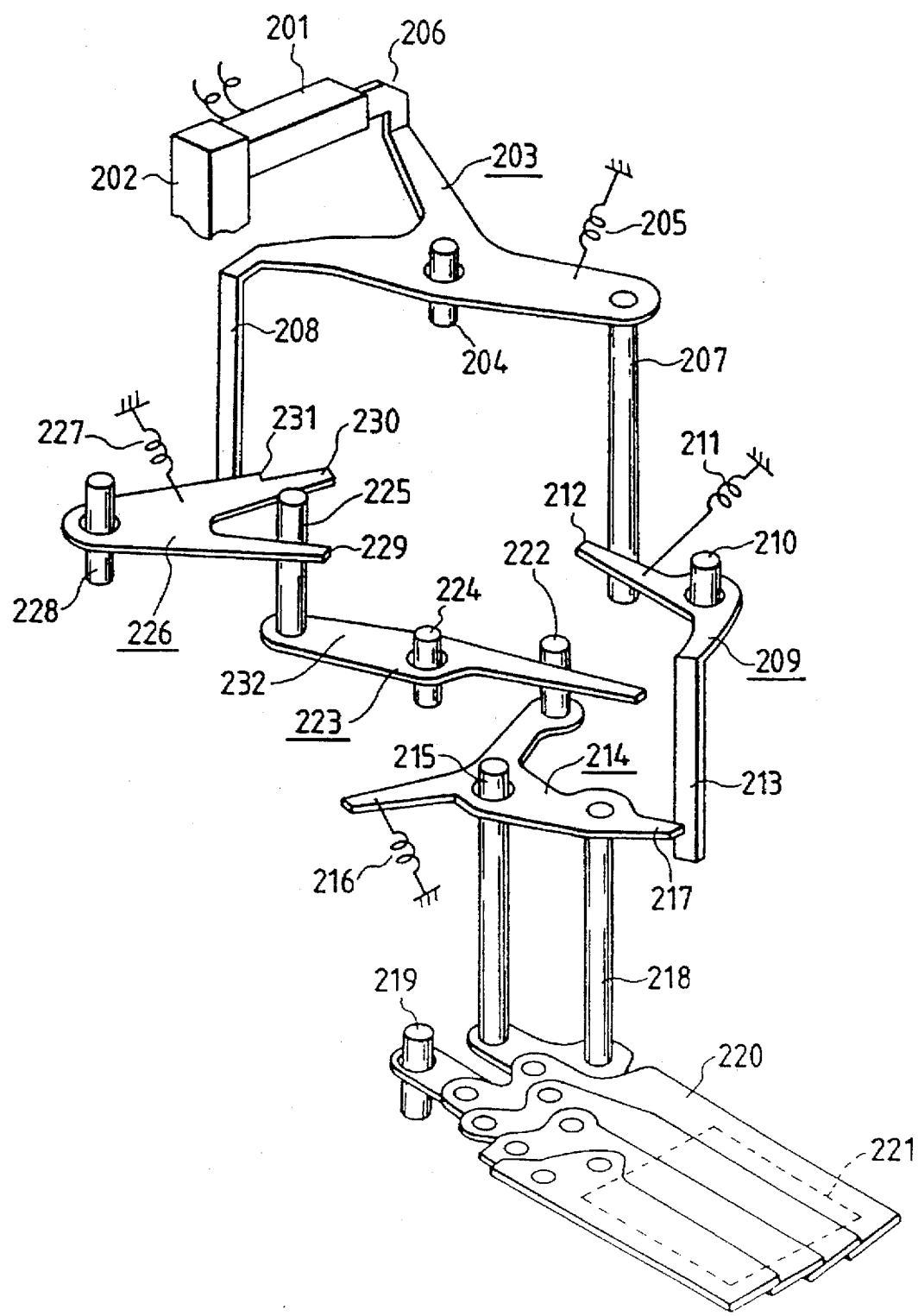
Figure 16:
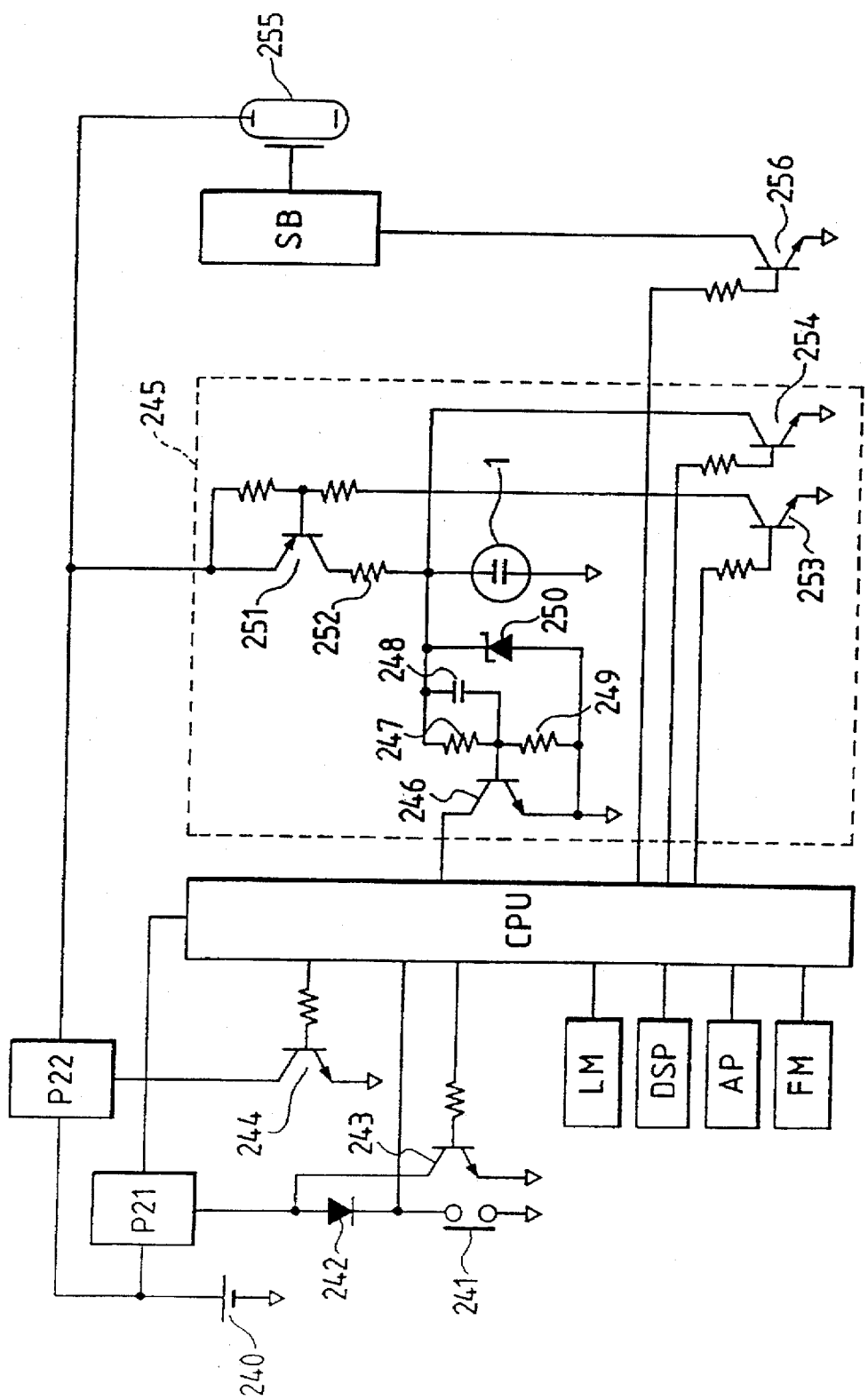

FIG. 16 is a block diagram of an electrical circuit for driving the mechanism shown in FIG. 15. The function of said circuit will be explained in the following.

A battery 240 powers power supply circuits P21, P22. The power supply circuit P1 releases an output voltage of about 5 V, for a control circuit including a CPU. The power supply circuit P2 releases an output voltage of about 200 V for driving the piezoelectric actuator 201 and also for driving a discharge tube 255 connected to a strobe circuit SB.

The function of the power supply circuit P21 is controlled by a half-stroke switch 241 linked with an unrepresented shutter button of the camera and the on-off state of a transistor 243 driven by the CPU. The state of the half-stroke switch 241 is also transmitted to the CPU. A diode 242 is inserted between the transistor 243 and the switch 241 in order to distinguish the on-states thereof. In such a configuration, after the half-stroke switch 241 is turned off by the termination of actuation of the shutter button, the transistor 243 remains turned on for a predetermined period, thereby extending the function state of the camera.

To the CPU there are also connected the following circuit blocks with input/output functions.

A light metering circuit LM enters an object luminance signal to the CPU. A display circuit DSP provides shutter time information to be controlled, and various alarm signals, in a visual or acoustic manner, based on signals from the CPU. An aperture control circuit AP controls a lens diaphragm to an appropriate aperture, base on a signal from the CPU. A film sensitivity signal reading circuit FM reads film sensitivity data, provided on a film cartridge in an already known manner, and sends said data to the CPU. Although the wirings are not illustrated, the above-explained circuit blocks are powered from the power supply circuit P21. In addition, there are provided, for example, a release switch linked with the shutter button and a switch indicating the sequence status of the camera.

The output voltage of the power supply circuit P22 is supplied to the strobe circuit SB, of which discharge tube 255 emits flash light by the activation of a transistor 256 by the CPU when the shutter is opened.

An upper terminal of the piezoelectric actuator 1 is given the output voltage of the power supply circuit P22 through a transistor 251 and a resistor 252. Said transistor 251 is controlled by a transistor 253 driven by the CPU. Said upper terminal of the piezoelectric actuator 201 is clamped by a Zener diode 250 and is further connected, through resistors 247, 249 and a capacitor 248, to a transistor 246. Also, the piezoelectric actuator 201 is grounded through a transistor 254, which is used for dissipating, immediately before the drive of the actuator, the charge accumulated therein until said drive.

The above-explained circuit functions in the following manner.

When the switch 241 is turned on, the power supply circuit P21 starts power supply to activate the CPU, which then calculates an appropriate exposure condition, based on the input signals from the light metering circuit LM and the film sensitivity signal detection circuit FM. The result of said calculation is displayed by the display circuit DSP, and an alarm is given in addition, if said condition is undesirable. At the same time, the transistor 244 is activated to accumulate the electric power from the power supply circuit P22 into an unrepresented capacitor, for driving the discharge tube 255.

When the closing of an unrepresented release switch is detected, there are conducted mechanical operations such as mirror lifting, followed by the leading curtain opening sequence, in which the transistor 253 is activated to turn on the transistor 251, whereby the output voltage of the power supply circuit P22 is applied to the piezoelectric actuator 201. Thus, said actuator 201 momentarily extends in the longitudinal direction, and the operations already explained in relation to FIG. 15 follow.

At the completion of opening of the leading curtain, the end 206 of the lever 203 hits the piezoelectric actuator 201 to generate therein a voltage, which is clamped by the Zener diode 250, whereby the transitor 246 is turned on for a predetermined period by the capacitor 248. The resistor 247 is provided for discharging the capacitor 248, while the resistor 249 is provided for preventing the erroneous function of the transistor.

The CPU, upon confirming the timing of completion of opening of the leading curtain 220 by the turning-on of the transistor 246, turns on the transistor 256 to activate the strobe circuit SB for effecting light emission from the discharge tube 255. The CPU can also display the signal indicating the completion of opening of the leading curtain, 220 through the display circuit DSP.

Figure 17:
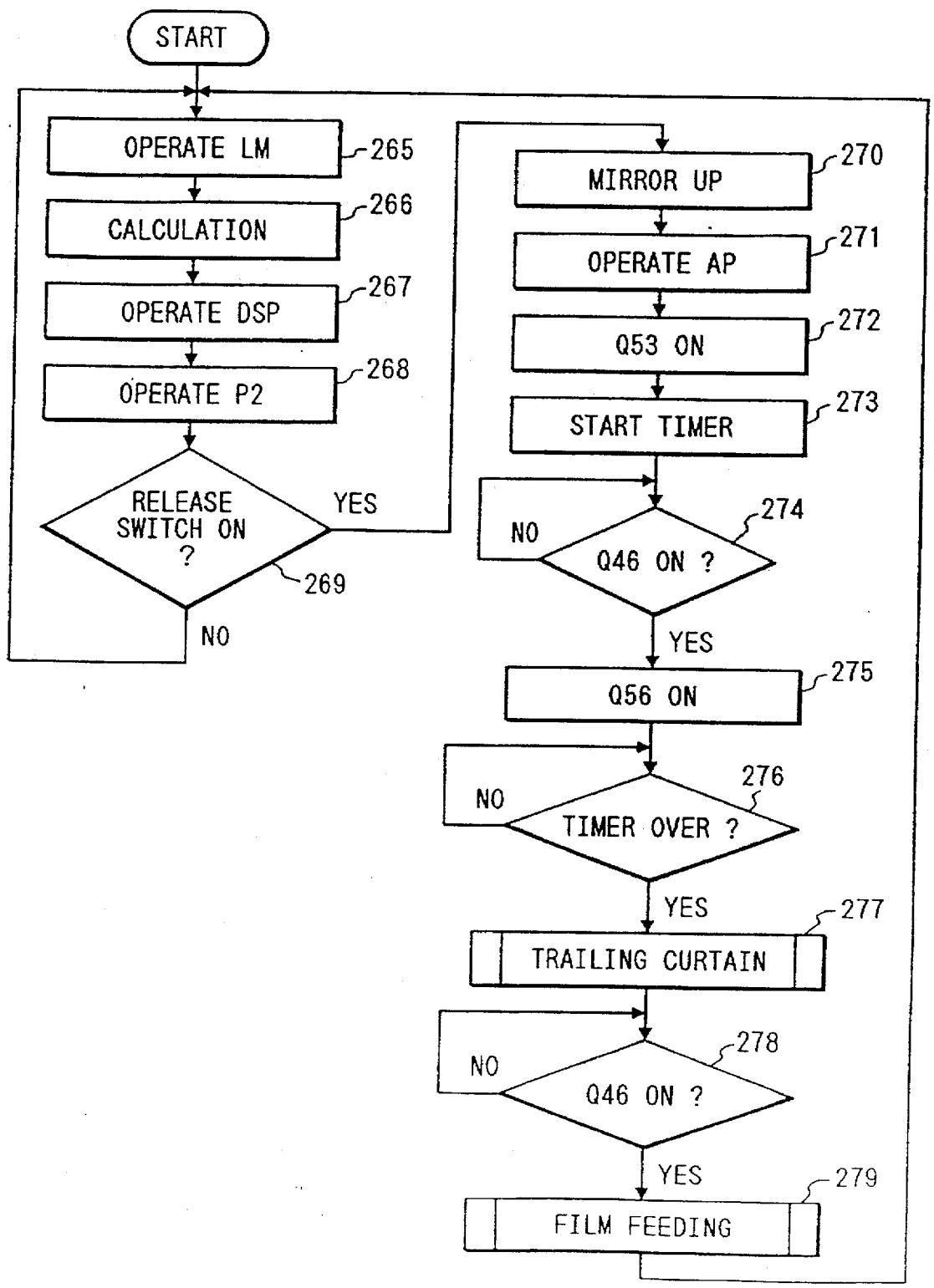

FIG. 17 is a flow chart showing an example of shutter sequence.

During the function of the power supply circuit P21, the CPU repeatedly executes this routine:

Step 265: obtains the object luminance signal from the light metering circuit LM;

Step 266: calculates an appropriate exposure condition, based on said luminance signal and the signal from the film sensitivity detection circuit FM;

Step 267: displays the condition obtained in the step 266, through the display circuit DSP;

Step 268: activates the power supply circuit P22;

Step 269: discriminates whether the release switch has been closed by the shutter button, and the sequence proceeds to the next step or returns to the step 265, respectively, if said switch is closed or not;

Step 270: lifts the mirror of the camera;

Step 271: drives the aperture control circuit AP to set the diaphragm at a predetermined aperture;

Step 272: turns on the transistor 523, whereby the transistor 251 is turned on to apply the voltage from the piezoelectric actuator 201. The aforementioned grounding of the piezoelectric actuator 201 by the transistor 254 may be conducted immediately before this step;

Step 273: starts measurement of the exposure time;

Step 274: discriminates whether the transistor 246 has been turned on, namely whether the opening of the leading curtain 220 has been completed, and the sequence proceeds to the next step if said switch has been turned on, but, if not, the sequence waits until said switch is closed;

Step 275: turns on the transistor 256 to cause the discharge tube to emit flash light, as the signal from the piezoelectric actuator 1 has been detected;

Step 276: discriminates whether the time measurement started in the step 273 has been completed, and the sequence proceeds to the next step if the time measurement has been completed, but, if not, the sequence waits until the completion of said time measurement;

Step 277: executes, after the lapse of the predetermined time, a process for controlling the trailing curtain, by driving the piezoelectric actuator for the trailing curtain;

Step 278: confirms the on-state of a transistor, in the control circuit for the trailing shutter curtain, corresponding to the transistor 246, thereby discriminating that the trailing curtain has properly functioned, as in the step 274, and the sequence proceeds to the next step if said transistor is turned on, but, if not, the sequence waits until said transistor is turned on;

Step 279: executes the film feeding routine, for shifting the diaphragm to the original state, lowering the mirror and feeding the film by a frame. Thereafter, the sequence returns to the step 265 to effect the process explained before.

Figure 18:
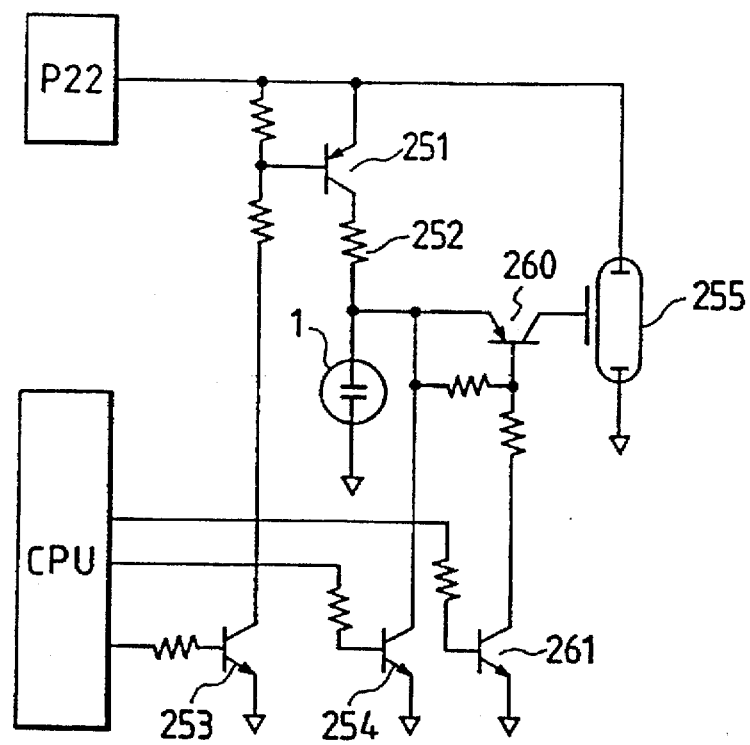
Figure 19:
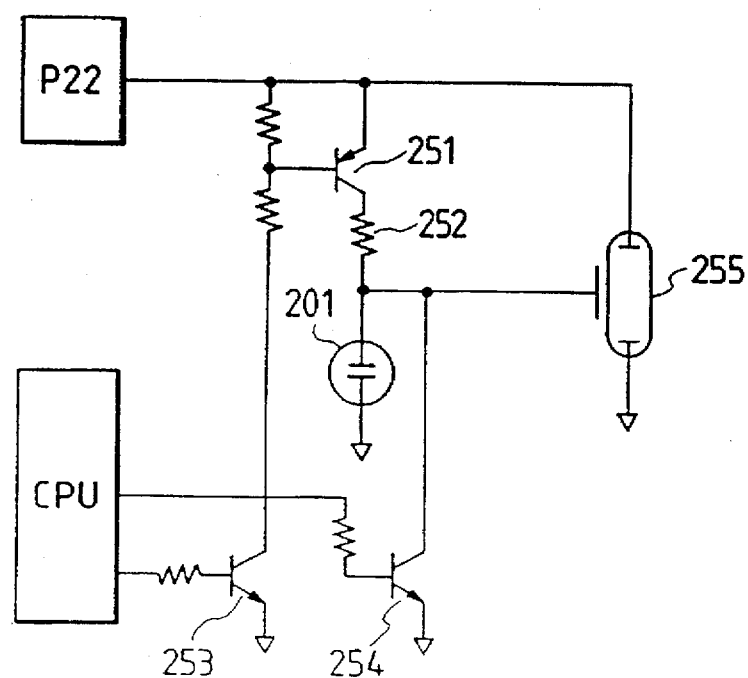

In the configuration shown in FIGS. 16 and 17, the voltage generated by the piezoelectric actuator is fetched by the CPU and utilized for the subsequent process. FIGS. 18 and 19 show another configuration in which the voltage from the piezoelectric actuator is directly applied to the strobe circuit SB by a hardware modification.

In FIG. 18, the voltage from the piezoelectric actuator 201 is transmitted to the strobe circuit SB through a transistor 261 which can be intermittently controlled by the CPU. In FIG. 18, components equivalent in function to those in FIG.

16 are represented by the same numbers. After the voltage is applied to the piezoelectric actuator 201 by the transistor 253, the transistor 261 is turned on. At the completion of opening of the leading curtain, the voltage generated by said actuator 201 is directly applied, through the transistor 260, to the discharge tube 255. Said voltage, sometimes reaching the level of several tens of thousand volts, is sufficient for initiating the discharge in the tube 255. In this configuration, the control by the CPU can be dispensed with. The activation of the transistor 260 after the voltage application to the piezoelectric actuator 201 is to prevent the occurrence that the discharge tube 255 is eventually activated by the output voltage of the power supply circuit P22 prior to the proper timing.

If the output voltage of the power supply circuit P22 is lower than the triggering voltage of the discharge tube 255, there may be employed a direct connection as shown in FIG. 19, thus dispensing with the transistor 261.

Figure 20:
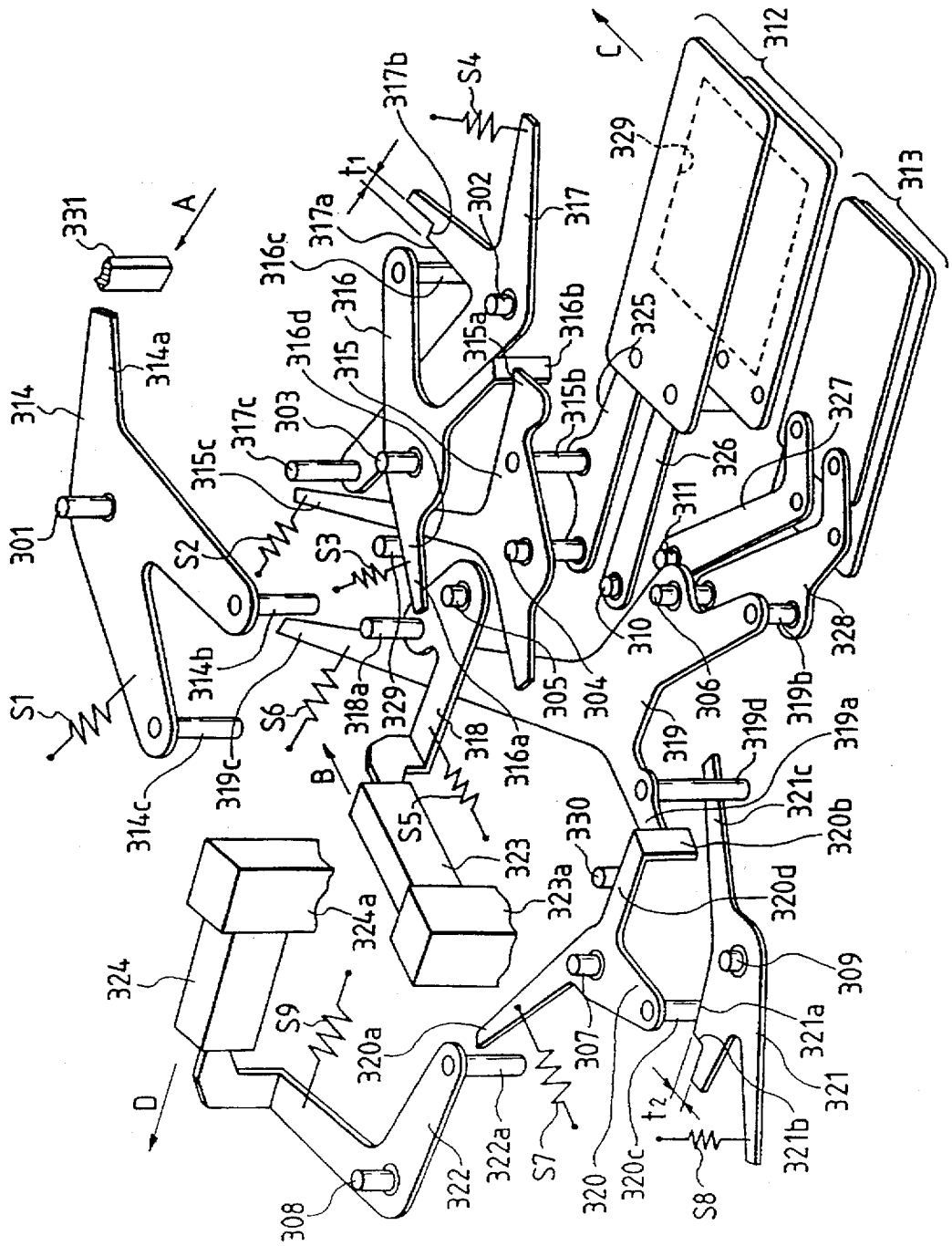

In the following, there will be explained a third embodiment of the present invention, applied to a shutter control mechanism as shown in FIG. 20, which illustrates a state after completion of shutter charging.

Shafts 301–311 and positioning pins 329, 330 are fixed on an unrepresented shutter base plate. A charging lever 314 is rotatably mounted on the shaft 301 and is clockwise biased by a spring S1.

A leading blade drive lever 315 is rotatably mounted on the shaft 304 and is counterclockwise biased by a spring S2. A leading hook 316 is rotatably mounted on the shaft 303 and is clockwise biased by a spring S3. A leading hook engaging lever 317 is rotatably mounted on the shaft 302 and is counterclockwise biased by a spring S4. A leading inertia lever 318 is mounted rotatably on the shaft 305 and is anticlockwise biased by a spring S5.

A trailing blade driving lever 319 is rotatably mounted on the shaft 306 and is counterclockwise biased by a spring S6. A trailing hook 320 is rotatably mounted on the shaft 307 and is counterclockwise biased by a spring S7. A trailing hook engaging lever 321 is rotatably mounted on the shaft 309 and is clockwise biased by a spring S8. A trailing inertia lever 322 is rotatably mounted on the shaft 308 and is clockwise based by a spring S9.

A leading drive arm 325 is rotatably mounted on the shaft 304 and is connected to a pin 315b fixed on the leading drive lever 315. A leading auxiliary arm 326 is rotatably mounted on the shaft 310, and constitutes a parallel link mechanism, in combination with the leading drive arm 325 and a leading blade 312.

A trailing drive arm 328 is rotatably mounted on the shaft 306 and is connected to a pin 319b fixed on the trailing driver lever 319. A trailing auxiliary arm 327 is rotatably mounted on the shaft 311, and constitutes a parallel link mechanism in combination with the trailing drive arm 328 and a trailing blade 313.

A laminate piezoelectric device 323 for the leading shutter blade is mounted on a mounting member 323a fixed on the unrepresented shutter base plate. A laminate piezoelectric device 324 for the trailing shutter blade is mounted on a mounting member 324a fixed on said base plate.

In the following there will be given a detailed explanation on the function of the present embodiment, together with the detailed structure. When an unrepresented shutter button is depressed, the lens diaphragm is regulated and the mirror is lifted as in the known single-lens reflex camera, whereupon a voltage is applied to the laminate piezoelectric device 323 for the leading shutter blade.

In response to said voltage application, said device 323 momentarily generates an extension, thereby hitting the leading inertia lever 318, which thus rotates clockwise about the shaft 305 against the biasing force of the spring S5. Upon said rotation, a pin 318a fixed on the leading inertia lever 318 collides with an arm 316a of the leading hook 316, thereby rotating said leading hook 316 counterclockwise against the biasing force of the spring S3.

As a result of rotation of said leading hook 316, a folded portion 316b thereof is disengaged from a finger 315a of the leading drive lever 315, which therefore rotates counterclockwise under the biasing force of the spring S2. As a result of said rotation, the leading shutter blade 312 connected to the pin 315b of said lever 315 moves in a direction C, thereby initiating the exposure of an image frame 329.

On the other hand, because of the rotation of the leading inertia lever 318, the leading hook 316 continues to rotate counterclockwise against the biasing force of the spring S3. A pin 316c fixed on the leading hook 316, maintained in contact with the leading hook engaging lever 317, passes through the lateral face 317a thereof and reaches a shoulder 317b, whereupon said engaging lever 317 rotates counterclockwise under the biasing force of the spring S4.

Figure 21:
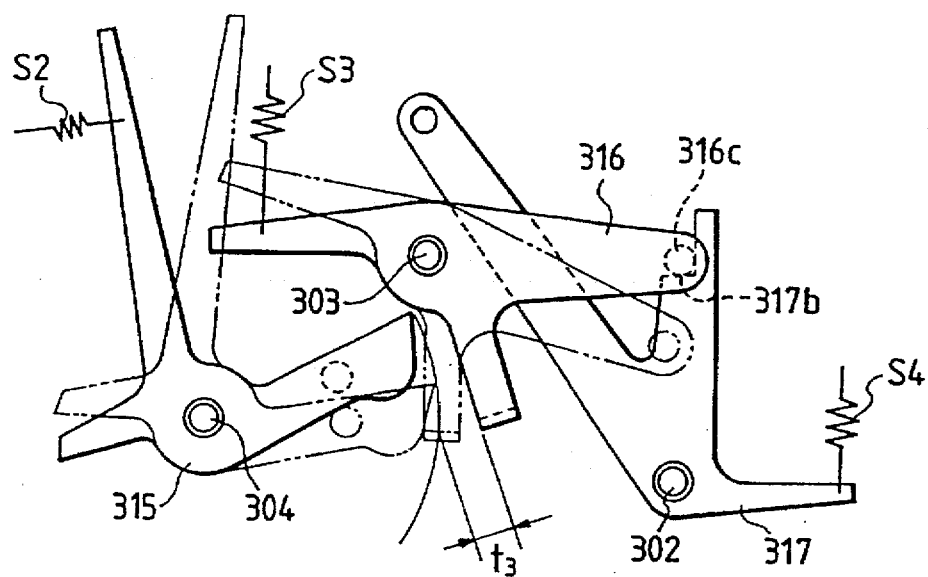

Subsequently, the leading hook 316 returns by clockwise rotation under the biasing force of the spring S3, but the leading hook 316 stops at a solid-lined position in FIG. 21, because the pin 316c thereof engages with the shoulder 317b of the leading hook engaging lever 317, as shown in FIG. 21.

After a predetermined time, a voltage is applied to the laminate piezoelectric device 324 for the trailing shutter blade, which in response momentarily generates an extension, thereby hitting the trailing inertia lever 322. Said lever 322 therefore rotates counterclockwise about the shaft 308 against the biasing force of the spring S9.

Upon said rotation, a pin 322a fixed on the trailing inertia lever 322 collides with an arm 320a of the trailing hook 320, thereby rotating said trailing hook 320 clockwise against the biasing force of the spring S7. As a result of rotation of said trailing hook 320, a folded portion 320b thereof is disengaged from a finger 319a of the trailing drive lever 319, which therefore rotates counterclockwise under the biasing force of the spring S6.

As a result of said rotation, the trailing shutter blade 313 connected to the pin 319b of said lever 319 moves in a direction C, thereby covering the image frame 329 and terminating the exposure.

On the other hand, because of the rotation of the trailing inertia lever 322, the trailing hook 320 continues to rotate clockwise against the biasing force of the spring S7. A pin 320c fixed on the trailing hook 320, maintained in contact with the trailing hook engaging lever 321, passes through the lateral face 321a thereof and reaches a shoulder 321b, whereupon said engaging lever 321 rotates clockwise under the biasing force of the spring S8.

Figure 22:
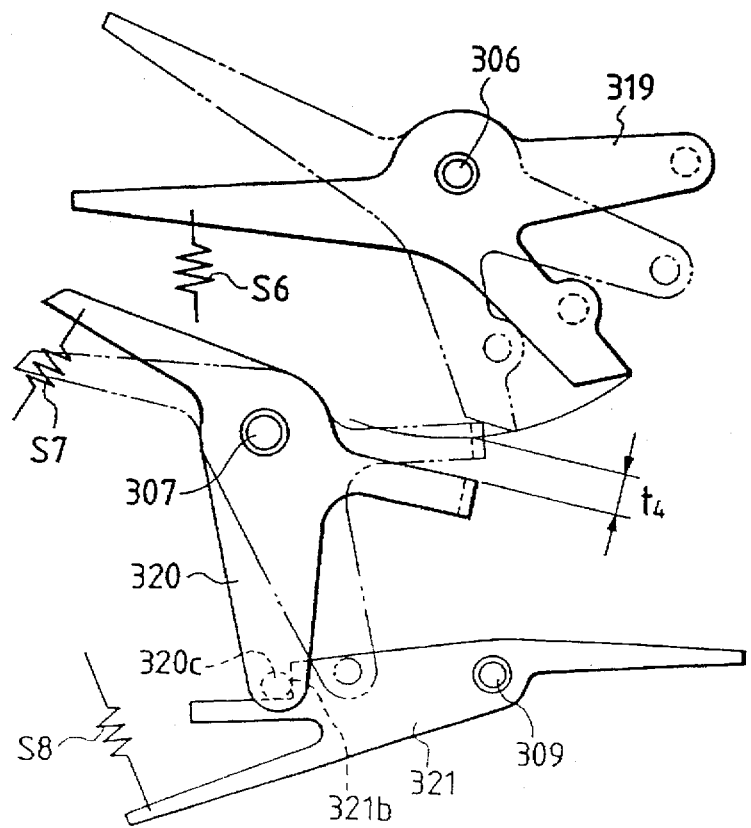

Subsequently the trailing hook 320 returns by counterclockwise rotation under the biasing force of the spring S7, but the trailing hook 320 stops at a solid-lined position in FIG. 22, because the pin 320c thereof engages with the shoulder 321b of the trailing hook engaging lever 321, as shown in FIG. 22.

In the shutter charging operation, a lever 331 mounted on an unrepresented camera body moves in a direction A and pushes an arm 314a of the charging lever 314, which thus rotates counterclockwise against the biasing force of the spring S1.

As a result of the rotation of the charging lever 314, a pin 314b fixed thereon comes into contact with and pushes an arm 315c of the leading drive lever 315, which therefore rotates clockwise against the biasing force of the spring S2.

Then, a pin 314c fixed on the charging lever 314 comes into contact with and pushes an arm 319c of the trailing drive lever 319, which therefore rotates clockwise against the biasing force of the spring S6.

Consequently the leading shutter blade 312 and the trailing shutter blade 313 are charged in a direction opposite to C, in a mutually overlapping state so as that the image frame 329 is not exposed.

Subsequently, the fingers 315a, 319a of the leading and trailing driver levers 315, 319 pass through positions capable of respectively engaging with the folded portions 316b, 320b of the leading and trailing hooks 316, 320.

Then the arm 315c of the leading drive lever 315 pushes the pin 317c fixed on the leading hook engaging lever 317, which therefore rotates clockwise against the biasing force of the spring S4. Thus, the pin 316c of the leading hook 316 and the shoulder 317b of the leading hook engaging lever 317 are disengaged. Therefore, the leading hook 316 rotates clockwise under the biasing force of the spring S3, and an arm 316d of said hook 316 stops at a position in impingement with the pin 329. In this position the finger 315a of the leading drive lever 315 can engage with the folded portion 316b of the leading hook 316.

Similarly, a pin 319d fixed on the trailing drive lever 319 pushes the arm 321c of the trailing hook engaging lever 321, which therefore rotates counterclockwise against the biasing force of the spring S8. Thus the pin 320c of the trailing hook 320 and the shoulder 321b of the trailing hook engaging lever 321 are mutually disengaged. Therefore the trailing hook 320 rotates counterclockwise under the biasing force of the spring S7, and an arm 320d of said hook stops at a position in impingement with the pin 330. In this position the finger 319a of the trailing drive lever 319 can engage with the folder portion 320b of the rear hook 320.

After reaching this state, the lever 331 returns in a direction opposite to A. Therefore the charging lever 314 rotates clockwise under the biasing force of the spring S1, and the leading drive lever 315 and the trailing drive lever 319 rotate counterclockwise under the biasing forces of the springs S2, S6. Since the leading hook 316 and the trailing hook 320 have already returned to engageable positions as explained above, the leading drive lever 315 and the trailing drive lever 319 are respectively stopped by said leading hook 316 and trailing hook 320, whereby the state shown in FIG. 20 is restored.

The leading hook engaging lever 317 and the trailing hook engaging lever 321 are provided for the following reason. The extension of the laminate piezoelectric devices 323, 324 obtained by voltage application is in the order of 0.01 mm. In the absence of said leading hook engaging lever 317 and said trailing hook engaging lever 321, the leading hook 316 and the trailing hook 320 in their returning motions under the biasing forces of the springs S3, S7 will collide with the leading and trailing drive levers 315, 319 as indicated by chain lines in FIGS. 21 and 22, whereby the shutter time may fluctuate. Consequently, the leading hook engaging lever 317 and the trailing hook engaging lever 321 have the function of securing gaps t3, t4 between the rotating trajectories of the leading drive lever 315 and the trailing drive lever 319 after disengagement thereof and the leading and trailing hooks 316, 320.

What is claimed is:

1. A shutter control device for controlling exposure time by at first releasing an engagement on a leading shutter curtain, and, after the lapse of a predetermined time, releasing an engagement on a trailing shutter curtain, the shutter control device comprising;

first and second laminate piezoelectric devices each generating a mechanical deformation under a voltage application;

a first driving force extraction member for obtaining a first driving force for releasing the engagement on said leading shutter curtain, in response to the deformation of said first laminate piezoelectric device;

a second driving force extraction member for obtaining a second driving force for releasing the engagement on said trailing shutter curtain, in response to the deformation of said second laminate piezoelectric device;

a first biasing member for biasing said first driving force extraction member toward a deforming face of said first laminate piezoelectric device; and a second biasing member for biasing said second driving force extraction member toward a deforming face of said second laminate piezoelectric device.

2. A shutter control device for controlling exposure time by at first releasing an engagement on a leading shutter curtain, and, after a lapse of a predetermined time, releasing an engagement on a trailing shutter curtain, the shutter control device comprising:

first and second engaging members for respectively engaging with said leading and trailing shutter curtains;

first and second laminate piezoelectric devices each generating a mechanical deformation under a voltage application;

a first engagement releasing member for releasing the engagement of said first engaging member, in response to the deformation of said first laminate piezoelectric device;

a second engagement releasing member for releasing the engagement of said second engaging member, in response to the deformation of said second laminate piezoelectric device;

a first driving member for driving said leading shutter curtain when said first engagement releasing member releases the engagement of said first engaging member from a first engaging position;

a second driving member for driving said trailing shutter curtain when said second engagement releasing member releases the engagement of said second engaging member from a second engaging position;

a first returning inhibition member for inhibiting the returning of said first engaging member, after being released from the engagement, again to the first engaging position; and a second returning inhibition member for inhibiting the returning of said second engaging member, after being released from the engagement, again to the second engaging position.

3. A shutter control device for controlling an exposure time by at first releasing an engagement on a leading shutter curtain, and after lapse of a predetermined time, releasing an engagement on a trailing shutter curtain, the shutter control device comprising:

first and second engaging members for respectively engaging with said leading and trailing shutter curtains in respective first and second engaging positions;

a first charging member for bringing said leading shutter curtain to the first engaging position with said first engaging member;

a second charging member for bringing said trailing shutter curtain to the second engaging position with said second engaging member;

first and second laminate piezoelectric devices each generating a mechanical deformation under a voltage application;

a first engagement releasing member for releasing the engagement of said fist engaging member, in response to the deformation of said first laminate piezoelectric device;

a second engagement releasing member for releasing the engagement of said second engaging member, in response to the deformation of said second laminate piezoelectric device;

a first driving member for driving said leading shutter curtain when said first engagement releasing member releases the engagement of said first engaging member;

a second driving member for driving said trailing shutter curtain when said second engagement releasing member releases the engagement of said second engaging member;

a first returning inhibition member for inhibiting the returning of said first engaging member, after being released from the engagement, again to the first engaging position; and a second returning inhibition member for inhibiting the returning of said second engaging member, after being released from the engagement, again to the second engaging position.

4. A shutter control device provided with a shutter device for effecting an exposure operation, and adapted to control the function of said shutter device, the shutter control device comprising:

a laminate piezoelectric device which generates a mechanical deformation under an application of an input voltage;

a driving force extraction member which obtains a driving force to drive the shutter device, in response to the deformation of said laminate piezoelectric element;

a biasing member which biases said driving force extraction member toward a deforming face of said laminate piezoelectric device; and a voltage application unit which determines an insulation state of said piezoelectric device, and which momentarily applies said input voltage to said piezoelectric device if said insulation state of said piezoelectric device is not a short circuit;

wherein said shutter device is adapted to initiate the function thereof by the momentary mechanical deformation of said piezoelectric device resulting from said momentary input voltage.

5. A shutter control method for effecting an exposure operation of a shutter, the method comprising:

biasing a driving force extraction member toward a deforming face of said laminate piezoelectric device;

determining an insulation state of a laminate type piezoelectric element;

momentarily applying an input voltage to said piezoelectric element so as to generate mechanical deformation in said piezoelectric element if said insulation state of said piezoelectric element is not a short circuit; and transmitting a momentary mechanical deformation of said piezoelectric element, which is caused by the momentary application of said input voltage thereto, to said driving force extraction member to generate a driving force to drive the shutter to cause the shutter to initiate the function thereof.

* * * * *

UNITED STATES PATENT AND TRADEMARK OFFICE
CERTIFICATE OF CORRECTION

PATENT NO. : 5,678,106

DATED : October 14, 1997

INVENTOR(S) : Tetsuro GOTO et al.

It is certified that error appears in the above-identified patent and that said Letters Patent is hereby corrected as shown below:

Col. 31, line 8, change "fist" to --first--.

Title page, 2, 1st. Col., line 2, change "etal." to --et al.--.

Title page, under Abstract, line 15, change "application in" to --application. In--.

Signed and Sealed this

Twelfth Day of May, 1998

Attest:

BRUCE LEHMAN

Attesting Officer

Commissioner of Patents and Trademarks